United States Patent
de Jong et al.

(10) Patent No.: US 11,724,833 B2
(45) Date of Patent: Aug. 15, 2023

(54) EXPANDABLE SYSTEMS FOR SPACE

(71) Applicant: THIN RED LINE AEROSPACE LTD, Chilliwack (CA)

(72) Inventors: Maxim de Jong, Chilliwack (CA); Brian Aiken, Las Vegas, NV (US)

(73) Assignee: THIN RED LINE AEROSPACE LTD, Chilliwack (CA)

( * ) Notice: Subject to any disclaimer, the term of this patent is extended or adjusted under 35 U.S.C. 154(b) by 595 days.

(21) Appl. No.: 16/726,784

(22) Filed: Dec. 24, 2019

(65) Prior Publication Data

US 2020/0148399 A1    May 14, 2020

Related U.S. Application Data

(60) Provisional application No. 62/784,633, filed on Dec. 24, 2018.

(51) Int. Cl.
| | |
|---|---|
| *B64G 1/58* | (2006.01) |
| *B64G 1/40* | (2006.01) |
| *B64G 1/22* | (2006.01) |
| *B64G 1/56* | (2006.01) |

(52) U.S. Cl.
CPC ............. *B64G 1/58* (2013.01); *B64G 1/226* (2013.01); *B64G 1/402* (2013.01); *B64G 1/56* (2013.01); *B64G 2001/224* (2013.01)

(58) Field of Classification Search
CPC ............ B64G 1/58; B64G 1/226; B64G 1/56
See application file for complete search history.

(56) References Cited

U.S. PATENT DOCUMENTS

| | | |
|---|---|---|
| 4,686,128 A | 8/1987 | Gentilman |
| 5,601,258 A | 2/1997 | McClymonds |
| 6,298,765 B1 | 10/2001 | Dvorak |
| (Continued) | | |

OTHER PUBLICATIONS

Written Opinion of the International Searching Authority, PCT/US2019/068506 dated Sep. 21, 2020.
(Continued)

*Primary Examiner* — Brady W Frazier
*Assistant Examiner* — Shanna Danielle Glover
(74) *Attorney, Agent, or Firm* — David A. Jones; Nadesan Beck P.C.

(57) ABSTRACT

Systems for insulating a space vehicle or space borne container from an external environment as well as cryogens from heat sources. Such systems also protect the vehicle from the high dynamic pressures, the high heat loads encountered in atmospheric flight, and provide storage capability that strongly limits, or effectively eliminates, cryogenic boil-off losses once in space. Such systems include an expandable structure having a plurality of contiguously adjacent expandable layers. The layers are connected by a plurality of tension connectors between successive layers. For launch and flight the layers can be restrained in a collapsed position. Whereupon exiting a free stream environment, the layers are expanded where they can lock into place or otherwise remain in an expanded state. The expansion creates separation between the layers with minimal conduction paths providing near theoretically perfect multilayer insulation and extremely effective debris protection.

46 Claims, 19 Drawing Sheets

(56) References Cited

U.S. PATENT DOCUMENTS

| | | | | |
|---|---|---|---|---|
| 6,547,189 | B1* | 4/2003 | Raboin | B64G 1/56 244/158.3 |
| 6,962,310 | B1* | 11/2005 | Bigelow | B64G 1/10 244/158.1 |
| 7,204,460 | B2* | 4/2007 | Bigelow | B64G 1/56 244/171.1 |
| 8,234,835 | B2 | 8/2012 | Dye et al. | |
| 9,327,848 | B2 | 5/2016 | Bigelow | |
| 9,944,452 | B1 | 4/2018 | Mills et al. | |
| 2012/0175467 | A1 | 7/2012 | Dye et al. | |
| 2018/0057190 | A1 | 3/2018 | Dye et al. | |

OTHER PUBLICATIONS

International Search Report, PCT/US2019/068506 dated Sep. 21, 2020.
https://web.archive.org/web/20170213013900/https://techport.nasa.gov/view/90537 "Fabric, Inflated, Insulating Shroud for Cryogenic In-Space Transportation, Phase II Project" accessed Aug. 19, 2020.

* cited by examiner

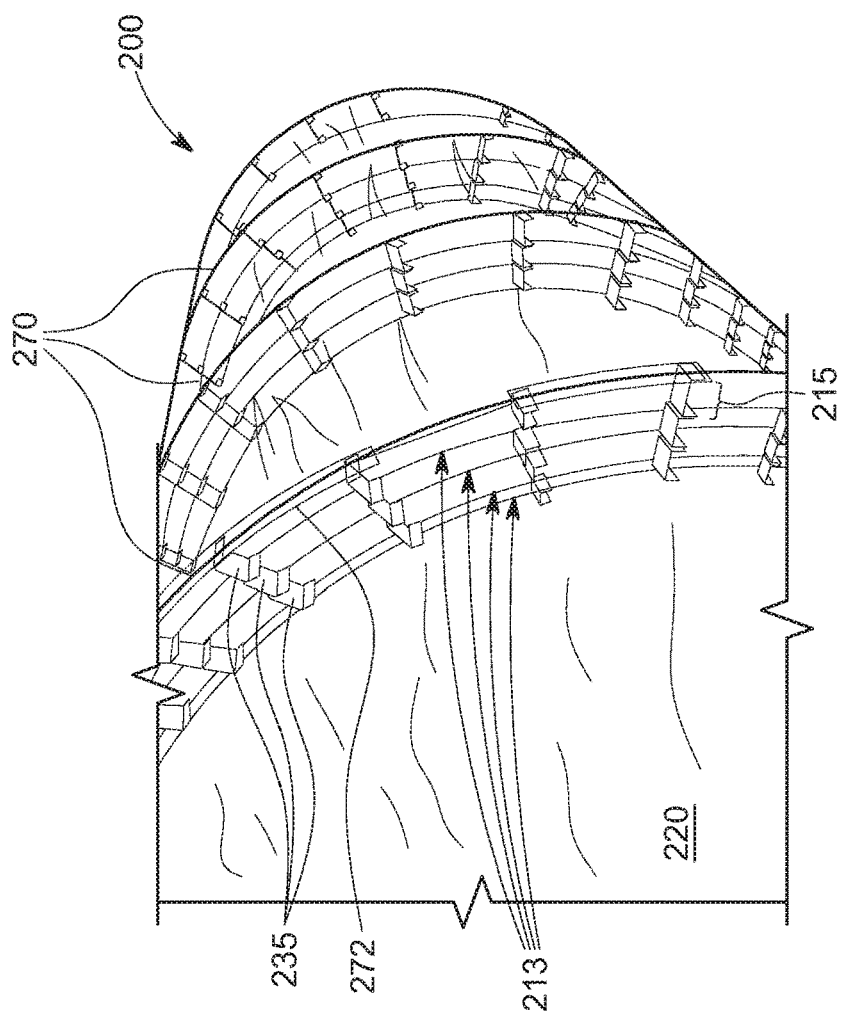
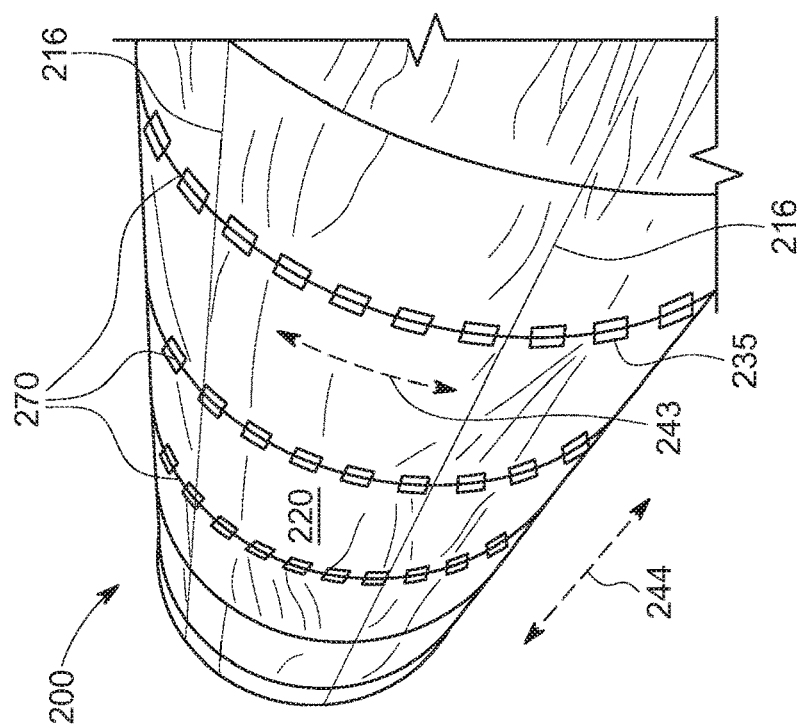
FIG. 2B
FIG. 2A

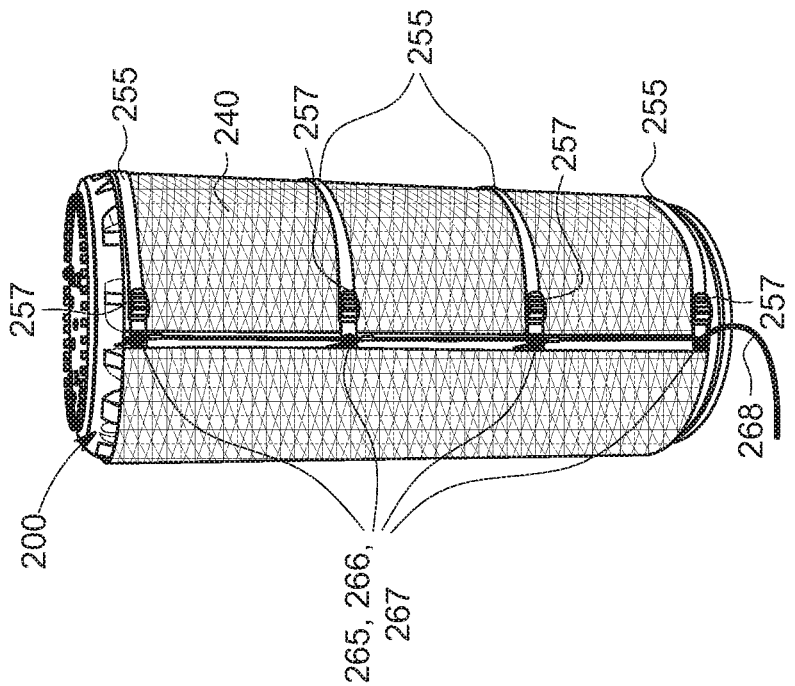
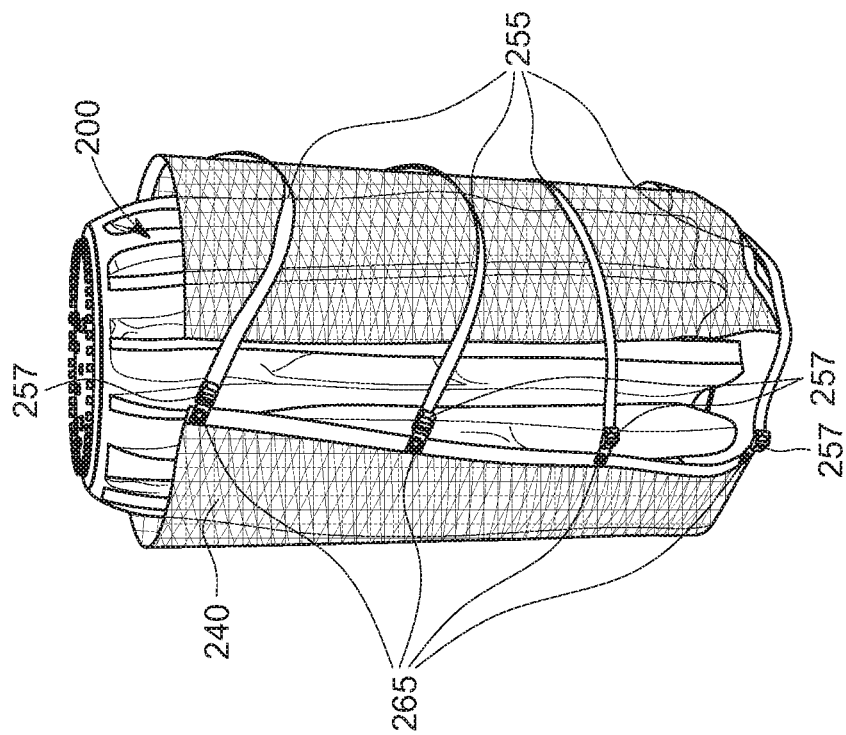
FIG. 5B
FIG. 5A

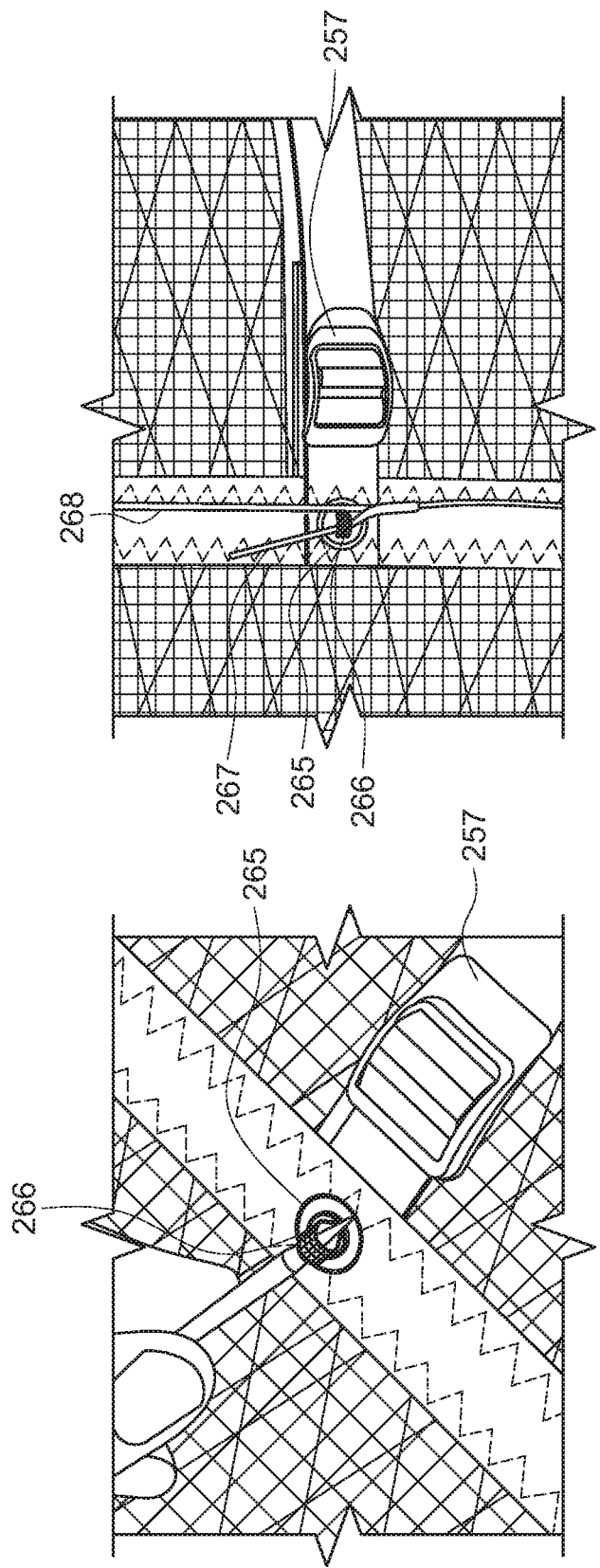

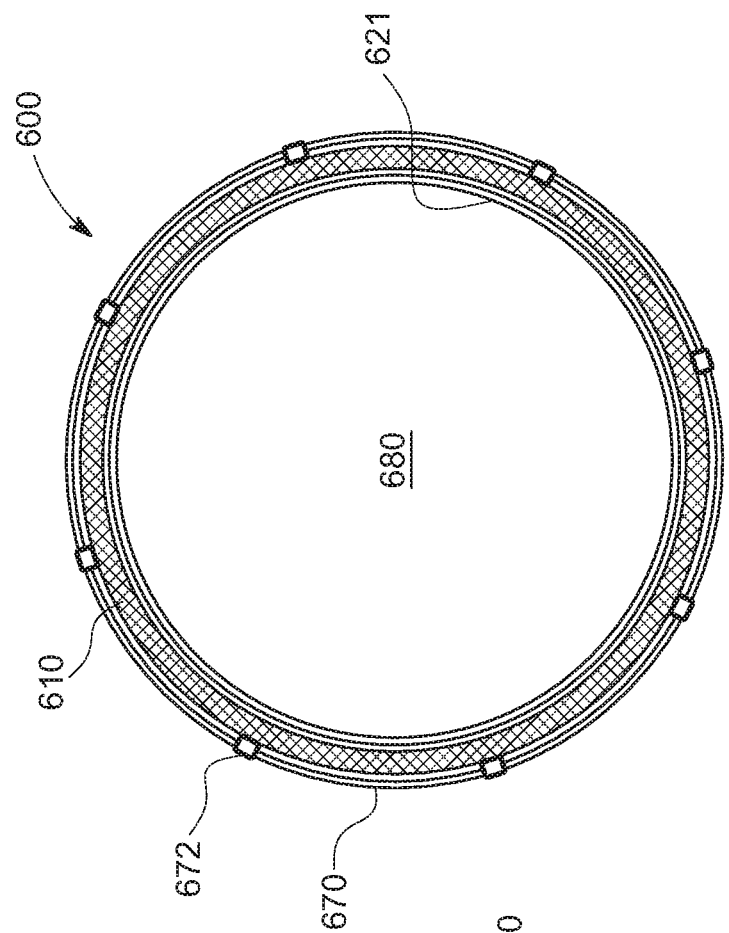
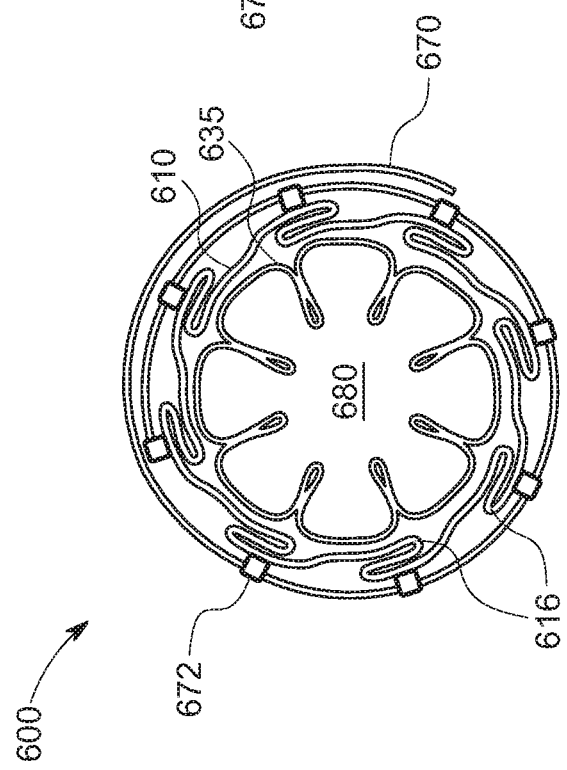
FIG. 6C
FIG. 6B

EXPANDABLE SYSTEMS FOR SPACE

CROSS-REFERENCE TO RELATED PATENT DOCUMENTS

This patent application claims the benefit of and priority to U.S. Provisional Patent Application 62/784,633 filed Dec. 24, 2018 and entitled EXPANDABLE SYSTEMS FOR SPACE having the common inventor de Jong, the contents of which are incorporated by reference herein.

STATEMENT REGARDING FEDERALLY SPONSORED RESEARCH OR DEVELOPMENT

This invention was made with Government support under contract NNX15CM38P awarded by the National Aeronautics and Space Administration. The Government has certain rights in this invention.

TECHNOLOGICAL FIELD

The present invention relates to lightweight, expandable systems for space vehicles and structures. In particular, such systems include insulation and shielding systems that can survive free stream exposure during spacecraft flight and maintain high protection and insulation performance on orbit, in space, and/or on or near celestial bodies.

BACKGROUND

In spaceflight, a launch vehicle or carrier rocket is a rocket used to carry a payload from the surface of a planet or other celestial body into orbit or outer space. A launch system includes the launch vehicle, the launch pad, and other infrastructure. An example of a launch vehicle is the Space Launch System (SLS). The SLS is an American Space Shuttle-derived heavy expendable launch vehicle. The SLS is part of NASA's deep space exploration plans including a manned mission to Mars. The NASA Authorization Act of 2010 envisions the transformation of the NASA Constellation program's Ares I and Ares V vehicle designs into a single launch vehicle usable for both crew and cargo, similar to Constellation's Ares IV. The SLS is to be the most powerful rocket ever built with a total thrust greater than that of the Saturn V, putting the SLS into the super heavy-lift launch vehicle class of rockets.

Most launch vehicles carrying high-mass payloads take advantage of the numerous benefits of liquid hydrogen (LH2) as fuel, with liquid oxygen (LOX) as oxidizer to facilitate combustion of the fuel. NASA describes liquid hydrogen as the "Fuel of Choice for Space Exploration" (see https://www.nasa.gov/content/liquid-hydrogen-the-fuel-of-choice-for-space-exploration). Hydrogen and oxygen are gases at room temperature and can only be liquefied at extremely low temperatures: Hydrogen boils at −252.87° C. (20.28 K; −423.17° F.) and Oxygen boils at −182.96° C. (90.19 K; −297.33° F.) at 101.325 kPa (760 mmHg) pressure. Maintaining liquid hydrogen and liquid oxygen at such extreme temperatures in their cryogenic state poses enormous technical challenges. To prevent onboard liquid hydrogen and liquid oxygen from violently evaporating, i.e. "boiling off", containment tanks for the rocket's cryogenic liquids must be meticulously insulated from any source of heat, such as the ambient environment before and after rocket launch; from rocket engine exhaust; and from aerodynamic heating during flight through the atmosphere. This insulative functionality, that simultaneously withstands high dynamic pressures in the free stream environment of the rocket's ascent phase, is traditionally addressed with foam insulation. Foam insulations are relatively heavy and potentially susceptible to sloughing off under influences such as inclement weather prior to launch, propellant tank icing damage, as well as in-flight effects such as vibration, free stream dynamics, and bird strikes—all factors which have the potential to reduce insulation effectiveness for the remainder of a mission, or worse, to compromise launch vehicle survivability.

In space, a vehicle must also be protected from the radiant heat of the Sun to prevent boil off of cryogenic liquids and the associated rapid volumetric expansion that can cause explosive failure of containment tanks storing the cryogens. A further challenge for protective insulation systems involves mitigation of the extreme cold of cryogenic liquids that can cause surrounding spacecraft structures to become brittle, and of temperature gradients that can cause leaks through seams connecting containment tank elements, particularly the welded seams of metallic tanks. This in-space insulative functionality requirement is typically addressed with so-called Multi-Layer Insulation (MLI) as shown in FIG. 1A. MLI is a system comprising a large number of gossamer, heat-reflecting foil layers separated by thin, gauze-like woven scrim layers.

The performance of a traditional MLI system is strongly dependent on manufacturing technique. Even with careful processing, seams and the interior insulation cut-outs that accommodate tank interface features contribute significant heat transmission through edge close-outs see Donabedian, Martin, and David G. Gilmore, eds. *Spacecraft Thermal Control Handbook*. Vol. 2. AIAA 2003.

Traditional MLI assemblies or "blankets" are not well suited for coverage of large cryogenic tanks. These traditional assemblies are usually formed into a mosaic of custom panels which require numerous interfacing attachments, seams between panels, and structural quilting, all of which result in heat losses that limit performance. Closeouts along the MLI panel peripheries inherently introduce parasitic heat leaks which are further exacerbated by localized compression of the MLI foil stack. In particular, the abutment of adjacent MLI panels requires additional closeout complexities to simultaneously permit trapped gas venting yet also overlap of adjacent MLI panels to prevent heat transfer. The process of panel joining is a labor-intensive seaming operation that commonly must be performed after the tank is built, adding to system build time. Additionally, static charge grounding straps are required to electrically ground MLI layers to the primary spacecraft structure. Furthermore, conventional MLI architectures require a thermal vacuum chamber for meaningful testing because of air convection. And, compression of MLI layers degrades the insulative capability of MLI systems, which also increases thermal conduction heat losses.

High thermal efficiency of an MLI blanket requires all constituent layers to be separated from adjacent layers by full coverage fabric scrim, foam spacers, or other compression resistant standoffs to preclude contact between adjacent layers and to eliminate the potential for thermal "shorting" that would render the traditional MLI insulation ineffective. Inspection for thermal shorting contact between adjacent shell layers is also difficult to verify after assembly of an MLI system.

So-called Integrated Multi-Layer Insulation (IMLI) resists compression-related insulative degradation by replacing scrim-type spacing with polymer posts to maintain MLI shell layer separation; but, in doing so, precludes system collapsibility for efficient packaging. And, the requisite large number of polymer spacers connecting adjacent MLI layers furthermore reduces IMLI performance. Thus, many of the innovative systems and methods disclosed herein present a great improvement in performance by eliminating the need for the spacer layers to support the weight of the heat reflecting MLI shell layers and/or other protective shield layers.

Another pursuit in space borne vehicle and container technology is related to protection from debris. Debris shielding includes functionality such as required for Micro-Meteoroid and Orbital Debris (MMOD) protection. Typically, debris shielding includes armor with two or more plates that are spaced a distance apart, which is aptly called spaced armour. The spaced armour configuration reduces the penetrating power of projectiles by causing projectiles to tumble, deflect, deform, and/or disintegrate with the projectile's passage through each successive armour plate.

A Whipple shield is a spaced armor shield that protects a spacecraft or space borne structure from damage due to collision with micrometeoroids and other minor debris travelling at high speed relative to the spacecraft or space borne structure (generically referred to as MMOD). Whipple shields are named after Fred Whipple who first suggested such shields in 1946 and referred to it as a "meteor bumper". In contrast to conventional monolithic shielding, Whipple shields consist of a relatively thin outer bumper layer spaced some distance from the main hull of the spacecraft or space borne structure. The outer bumper is not expected to stop the incoming particle or even remove much of its energy. Rather, the outer bumper is designed to fragment the particle and disperse its resultant debris, dividing the original particle energy among many fragments that conically fan out between the initial impact with the shield and the hull of the spacecraft or space borne structure. As such, the original particle energy is dispersed over a larger wall area of the spacecraft hull or space borne structure, which is more likely to withstand the relatively minor fragment impacts. The shield can be configured with a multitude of successive bumper shell layers to allow for a hull to be built to a thickness needed for structural integrity with minimized consideration for MMOD protection. While the shield assembly itself adds little additional weight, multiple thin shield layers increase the protective capability of the system over selection of an increased hull thickness. Such a Whipple shield protected spacecraft or space borne structure is lighter weight than a spacecraft or space borne structure with adequately robust hull designed to stop the meteoroids directly.

However, while the conventional Whipple shield lowers total spacecraft or space borne structure mass, the volume demanded by the significant spacing between protective layers can be an impediment by requiring a larger launch vehicle payload fairing to transport a payload comprising such a spacecraft or space borne structure to or through space. Furthermore, as with MLI, the efficacy of conventional Whipple shield assemblies is critically reliant on maintenance of spacing between constituent layers. Compression or other deviation from the prescribed bumper layer spacing diminishes the debris shielding capability of the Whipple shield. Thus, there remains a need for improved debris shielding for space borne vehicles and containers that pursues the need for reduced mass along with reduced fairing and launch volume requirements.

Examples of related background concepts are discussed in U.S. Pat. No. 6,481,670 B1 entitled "Apparatus for Spacecraft Thermal Management;" U.S. Pat. No. 6,547,189 B1 entitled "Inflatable Vessel and Method;" and, U.S. Publication 2012/0175467 "Micrometeoroid and Orbital Debris (MMOD) and Integrated Multi-Layer Insulation (IMLI) Structure." Each of the aforementioned patents and publication address conductive and compressive stand-off insulation as opposed to the teachings disclosed hereinafter.

The subject matter claimed herein is not limited to embodiments that solve any particular disadvantages unless recited therein or that operate only in environments such as those described above unless recited therein. Rather, this background is only provided to illustrate technology areas where some embodiments described herein may be practiced.

SUMMARY

Embodiments of the invention are directed to an expandable system for at least partially surrounding a structure in space. The expandable system can include a first shell layer and a second shell layer disposed contiguously adjacent to the first layer. The expandable system can include a tension connector disposed between the first shell and second shell layer. The tension connector can be connected to adjacent surfaces of the first shell layer and the second shell layer. The tension connector can retain in tension the first shell layer relative to the second shell layer prior to, during, and/or after expansion of the expandable system.

In some embodiments, the second shell layer is passively distended relative to the first shell layer by internal gas expansion. The internal gas expansion can occur due to a pressure differential due to a reduced environmental pressure. The second shell layer can be an outermost shell layer of the expandable system. And, the second layer can include one or more vent aperture. The one or more vent aperture allowing for gas to be released from inside the second shell layer of the expandable system to the environment outside of the expandable system.

The tension connector can be substantially inelastic. In some embodiments, the tension connector is foldable prior to expansion of the expandable system. The tension connector can have a greater length than cross sectional thickness. For example, the length of the tension connector can be at least 100 times larger than the thickness of the tension connector. The tension connector can be not resistant to collapsing. As such, the tension connector can be highly collapsible under a negligible amount of force or even its own weight. The tension connector can be strip of material. The tension connector can be in the form of a strip of material adhered at opposing ends to the adjacent surfaces of the first shell layer and the second shell layer.

The expandable system can include an extendable support member. The tension connector can be statically supported by the extendable support member when the expandable system is fully expanded. The second shell layer can be an outermost shell layer and an expandable support member including a support batten can support the second shell layer. The second shell layer can include a batten sleeve, the support batten extending within the batten sleeve. And, the support batten can be extendable and configured to lock in an extended state. The support batten can in a circumferential, spiral, or meridional direction relative to a central axis of the expandable system.

In some embodiments, the expandable system can include a rigidizing media. The rigidizing media can be applied to the second shell layer or an exterior cover. The rigidizing media maintains the tension of the tension connector according to such embodiments. The rigidizing media can include a resin and/or adhesive that hardens upon exposure to an environmental condition. And, the environmental condition can include ultraviolet light.

The first shell layer can be an innermost shell layer. And, the first shell layer can conform to an outer surface of the structure. In some embodiments, the first shell layer and second shell layer are passively distended by internal gas expansion due to reduced exterior pressure. In other embodiments, the first shell layer and second shell layer are actively distended. In some embodiments, the first shell layer and/or second shell layer can also be actively distended by a pump, by gas from a reservoir, or by a gas generator. The structure can include a cryogenic tank surrounded at least in part by the expandable system.

The expandable system can include a compression system. The compression system can compress the second shell layer against the first shell layer. And, the expandable system can include an exterior cover surrounding the expandable system. The exterior cover can include a fabric woven from fibers. The fibers can include NEXTEL, ZYLON, and/or TECHNORA. The fibers can include glass, carbon, ceramic, liquid-crystalline polyoxazole, and/or aramid. The exterior cover can include a flexible radiator panel and/or a flexible solar panel. The expandable system can include a release system, the release system releasing the compression system thereby allowing at least the second shell layer to distend under internal pressure.

The expandable system can include a heat resistant coating or film maintaining fabric integrity and providing surface finish resistant to aerodynamic force. The coating or film can include silicone, a fluoropolymer, and/or fluorinated ethylene propylene. The coating or film can include KAPTON.

The expandable system can include a plurality of additional shell layers and additional tension connectors, each tension connector connecting adjacent surfaces of adjacent shell layers. For example, the expandable system can include at least five shell layers.

In some embodiments, the second layer can include a polyester or polyamide film. And, at least the second layer can incorporate a metallic film or vapor deposited metal coating. At least the second layer can a protective layer. The second layer can incorporate materials, fibers, and/or coatings shielding against debris moving at high relative speed, i.e. "debris shielding". At least the second layer can include a shear-thickening resin, ceramic or glass fiber-based fabric. At least the second layer can include a fabric woven from high-modulus debris shielding fiber. At least the second layer can include VECTRAN, ZYLON, TECHNORA, KEVLAR, or NEXTEL. At least the second layer can be laminated on one or both sides with one or more plastic films. And, in some embodiments, at least the second layer incorporates a plastic film with vapor deposited metal coating. At least the second layer can be laminated on one or both sides with KAPTON, UPILEX, or MYLAR.

Methods of expanding an expandable system are disclosed. Such methods can include providing the expandable system in collapsed state, transporting the expandable system to a destination, and once at the destination, the expandable system expanding into an expanded state. Certain methods include releasing an exterior cover surrounding the expandable system. And, certain methods for expansion of a system include passively expanding due to reduced environmental pressure.

In some embodiments, systems include an expandable system in combination with a fairing. The expandable system can be configured to expand from a collapsed position to an expanded position within the fairing.

In some embodiments, a structure is provided with an expandable system in a collapsed state prior to expansion. The expandable system can include a first shell layer having a cross-sectional area and a second shell layer disposed upon the first shell layer. The second shell can be larger in cross-sectional area than the first shell layer. The second layer can be folded so as to have a folded cross-sectional area substantially similar to the cross-sectional area of the first shell layer. The first shell layer conforms, in some embodiments, to an outer surface of a structure.

The expandable structure can include a collapsed tension connector connecting opposing adjacent surfaces of the first shell layer and the second shell layer. The collapsed tension connector can be folded between the first shell layer and the second shell layer in the collapsed state prior to expansion.

A system for surrounding at least in part a structure in space can include a first shell layer, a second shell layer disposed contiguously adjacent to the first layer, a tension connector disposed between the first shell and second shell layer. The tension connector can be connected to adjacent surfaces of the first shell layer and the second shell layer. And, the tension connector can retain in tension the first shell layer relative to the second shell layer.

A system can include a support member pre-tensioned prior to being transported to space. The support member being an extendable support member.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

FIG. 2A shows illustrations of an expandable protective system in its collapsed state;

FIG. 2B shows illustrations of the expandable protective system of FIG. 2A in its distended state;

FIG. 5A shows an exterior cover installation prior to tensioning;

FIG. 5B shows the tensioned exterior cover;

FIG. 5C is a close-up view of an exterior cover release pin loop, grommet, and tensioning buckle;

FIG. 5D is a close-up view of examples of the components of an exterior cover closure and release mechanism;

FIG. 6B is a cross-sectional diagram of a parent structure and the collapsible/expandable system in its collapsed state;

FIG. 6C is a cross-sectional diagram of the parent structure and the collapsible/expandable system of FIG. 6B in its distended state;

DETAILED DESCRIPTION

Figure 1B:
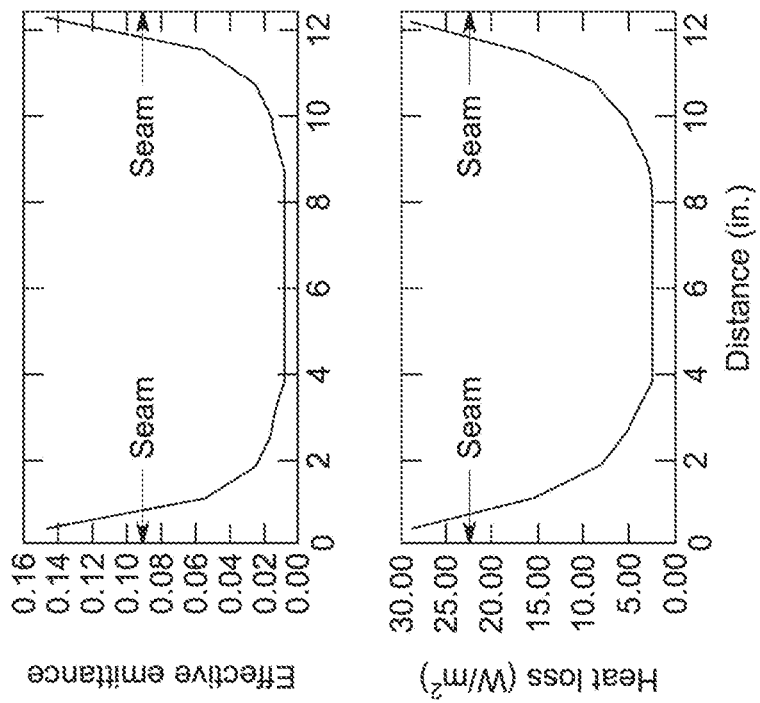
FIG. 1B (prior art) graphically shows edge heat loss associated with traditional multi-layer insulation (from Donabedian, Martin, and David G. Gilmore, eds. *Spacecraft Thermal Control Handbook*, Vol. 2. AIAA 2003)

In the following detailed description describing examples of several embodiments of the invention, reference is made to the accompanying drawings that form a part hereof. The drawings are shown by way of illustrating the specific examples and embodiments discussed in further detail hereinafter. The embodiments illustrated are described in sufficient detail to enable those skilled in the art to practice the teachings disclosed herein. Other examples and embodiments can be utilized and derived therefrom, such that structural and logical additional elements, substitutions, and modifications can be made without departing from the scope of the claimed inventions. The following detailed description therefore, is not to be taken in a limiting sense, and the scope of various embodiments is defined only by the appended claims, along with the full range of equivalents to which such claims are entitled.

A. Expandable Shell System

Many embodiments disclosed hereinafter are directed to a multi-functional system. One or more such multi-function systems can simultaneously: (a) insulate a space vehicle or space borne container from an external environment, (b) insulate a space vehicle's cryogens from heat sources, (c) protect the vehicle from the high dynamic pressures and the high heat loads encountered in atmospheric flight, and/or (d) provide storage capability that strongly limits, or effectively eliminates, cryogenic boil-off losses once in space. Such systems can also provide protective shielding to counter forms of radiation beyond thermal, as well as protect the space vehicle or space borne container from the threat of impact with MMOD. Thus, the current invention can alternately be configured to specifically provide high performance thermal insulation, radiation shielding, and/or debris shielding functionality as required. The innovative systems disclosed herein may fulfil any or all of the aforementioned thermal, radiative, and structural protective needs.

Embodiments discussed hereinafter can provide solutions to the detraction from the original Whipple shield design. For example, several embodiments provide a collapsible and accurately expandable system of protective shell layers that provide optimized shielding against debris moving at high relative speed, i.e. "debris shielding", and MMOD protection capability while simultaneously providing near-theoretically-perfect MLI performance. The design, material selection, reinforcement and spacing of such systems' shell layers can be optimized to provide maximum MMOD protection for specific mass and/or volume constraints. Such systems are further scalable with interior "parent structure" size, heat load requirement, and mission duration.

A spacecraft, or any other space structure that benefits from the protective attributes of the herein described expandable system, is generically referred to as "parent structure". Referring to FIGS. 2A, 2B, 2C, and 2D an expandable protective system 200 is illustrated that is installed on a parent structure 220 such as on space vehicles, liquid fuel and oxygen containers, and other space structures to meet the need for multifunctional performance including provision of structure, radiation and/or thermal protection, and/or MMOD protection.

Figure 2C:
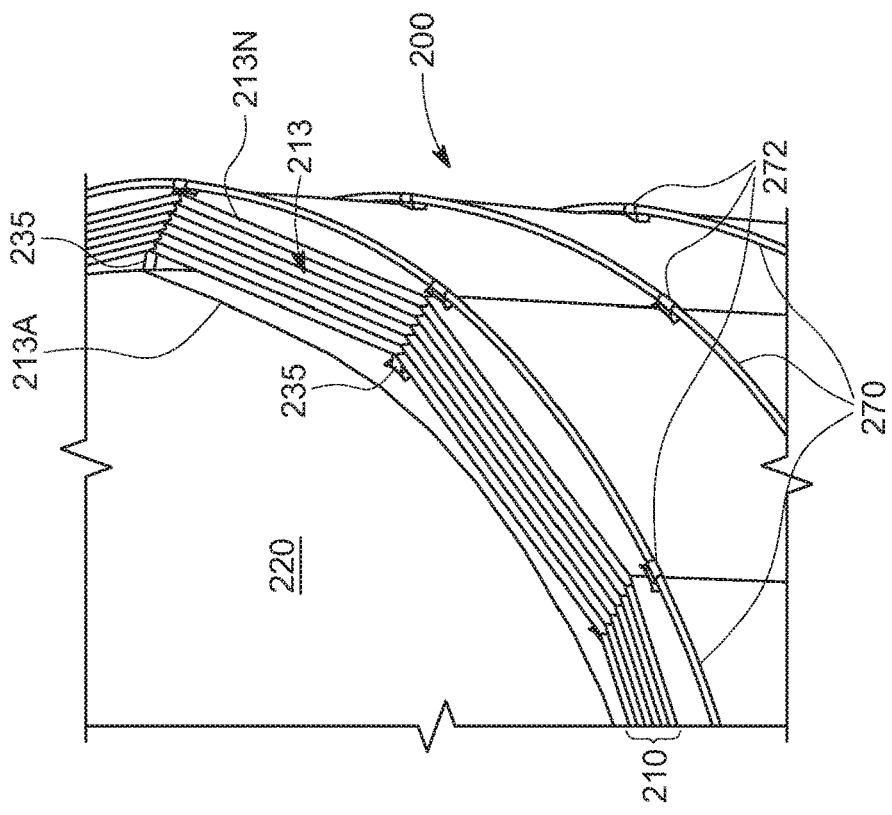
FIG. 2C shows illustrations of the expandable protective system in its distended state.
Figure 2C:
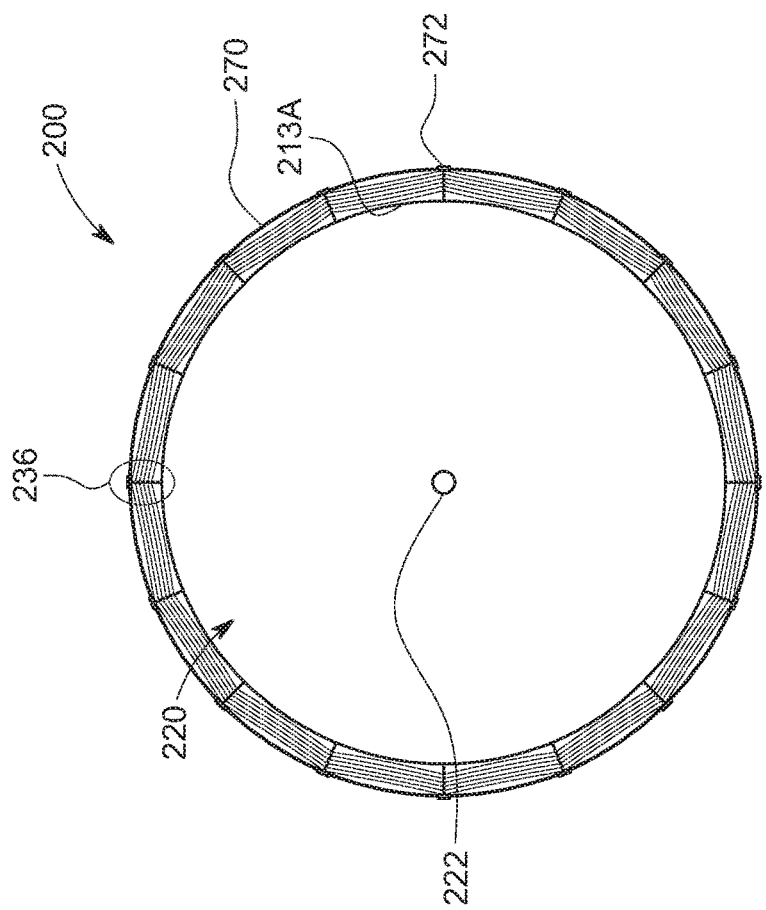
Figure 2D:
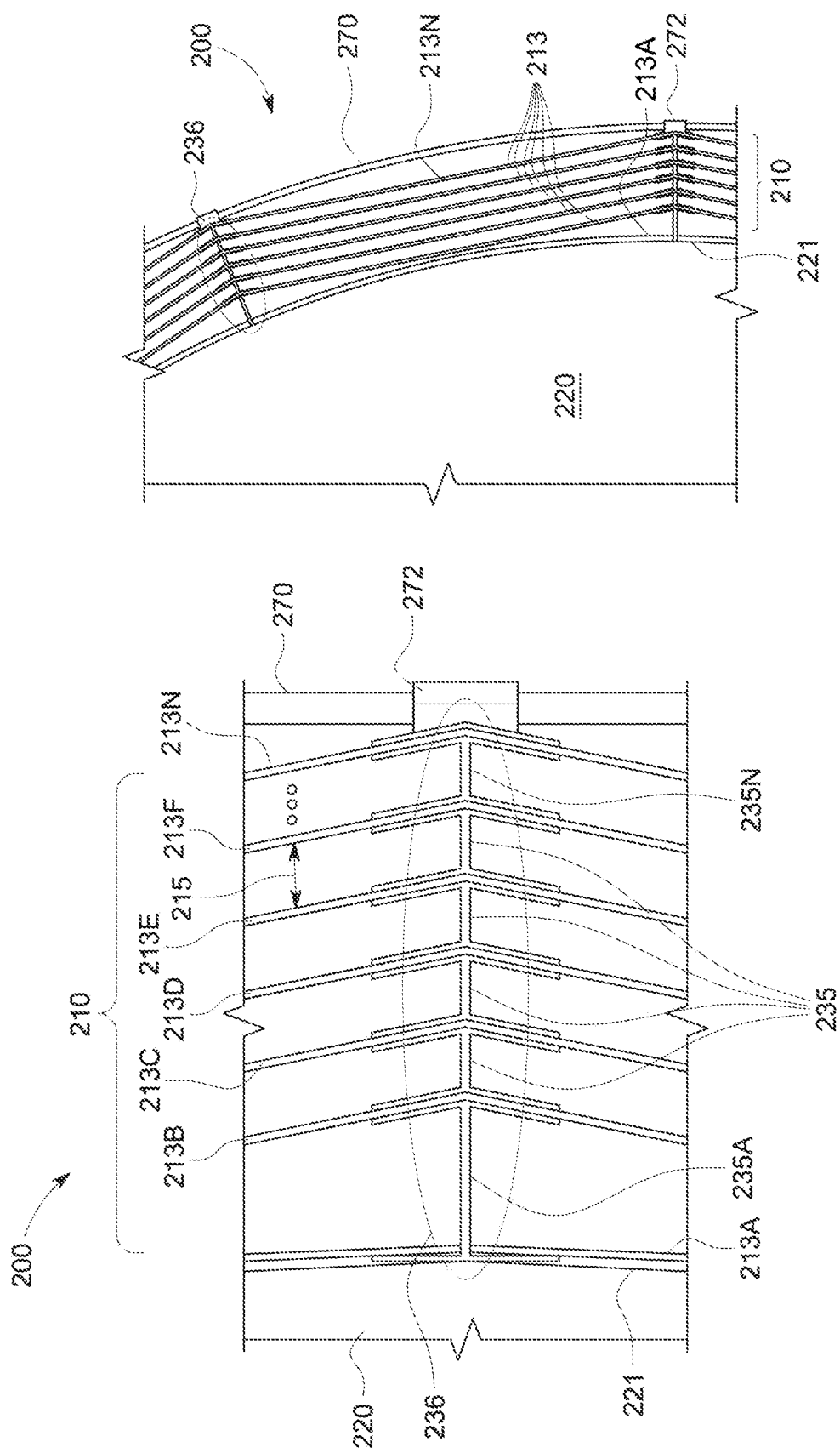
FIG. 2D shows close-up illustrations of the expandable protective system in its distended state.

The embodiment shown in FIGS. 2A, 2B, 2C, and 2D includes a plurality (also referred to as a "stack" 210) of nested protective shell layers 213 that envelope a portion, or all, of the parent structure 220. The shell layers 213 are disposed contiguously adjacent one-another with each shell layer 213 being of sequentially increasing size. Any of the disposed contiguously sequentially adjacent shell layers 213A-N may be referred to as a first shell layer and adjacent shell layer a second shell layer. Shell layer 213A can be a first shell layer relative to sequentially adjacent shell layer 213B, shell layer 213B can be referred to as a first shell layer relative to 213C, and so forth as shown in FIG. 2D, for example. In an embodiment the protective shell layers 213 in this example are concentrically spaced. This embodiment of the expandable shell system 200 illustrating the invention has both a collapsed state shown in FIG. 2A, and a distended, or expanded, state shown in FIGS. 2B, 2C, and 2D. The distended state shown in FIGS. 2B. 2C, and 2D can be obtained through expansion of the protective shell system 200 from its collapsed state shown in FIG. 2A. Expansion of the protective shell layer stack 210 introduces separation 215 shown in FIG. 2D (see also 315 shown in FIG. 3C) between the individual shell layers 213 whereby in the distended state of the expandable system 200 shown in FIGS. 2B, 2C, and 2D the individual shell layers 213 of the stack 210 are substantially concentrically spaced such that individual shell layers 213 do not directly contact one-another upon expansion.

In its collapsed state shown in FIG. 2A, an embodiment of the expandable system 200 is packaged closely around its parent structure 220, thereby substantially conforming to the outer surface 221 (see e.g. FIG. 2D) or so-called outer mold line ("OML"), of the parent structure 220. In the collapsed state, as well as after expansion of the protective system 200, the stack's innermost, or base shell layer 213A (see also 313A), remains substantially conformant to the geometry of the parent structure's 220 outer surface 221, thereby necessarily being also dimensionally the smallest of the protective shell layers 213. Moving outwards from the base shell layer 213A (see also 313A), subsequent shell layers 213 of the shell layer stack 210 sequentially and substantially concentrically increase in size, with the outermost, or most outermost shell layer 213N (see also 313N), being dimensionally the largest layer 213. Embodiments of the current invention may have one or more intermediate, or internal, shell layers 213 in addition to and positioned between the base shell layer 213A (see also 313A) and the outermost shell layer 213N (see also 313N). Thus, the stack 210 of shell layers may have any number of intermediate shell layers 213. However, according to other embodiments only the base shell layer 213A (see also 313A) and outermost shell layer 213N (see also 313N) are implemented.

The desired spatial separation 215 (see also 315) of successively larger shell layers 213 in the system's 200 distended state is facilitated by flexible tension connectors 235. The flexible tension connectors 235 connect adjacent shell layers 213 to one-another and retain the alignment and spacing of connected shell layers 213. The number of shell layers 213, as well as the measure of their separation 215 (see also 315), is predominantly tailored to the thermal and/or structural protective requirements of the expandable protective system 200.

Low-volume and conformal packaging of any space borne hardware, such as a parent structure 220 launching to space, is a valuable attribute. In its collapsed state of the embodiment shown in FIG. 2A, the stack 210 of protective shell layers 213 can be packaged tightly around the parent structure 220. The internal shell layers, represented in FIG. 2D by 213B thru 213F and in FIG. 3C by 313B, and the outermost shell layer 213N (see also 313N) can incorporate folds or pleats 216 (see e.g. FIG. 2F) to present a reduced effective surface area thereby allowing the shell layer stack 210 to be collapsed substantially conforming the stack 210 of shell layers 213 the to the dimensions of the base shell layer 213A (see also 313A) and the underlying OML 221 of the parent structure 200.

With regard to thermal insulation, and as discussed in detail in Section I, in actual specific non-limiting embodiments applied by the inventors to a cryogenic tank parent structure 220 as shown in FIGS. 2A and 2B, only six (6) shell layers would be required (including 20% performance error margin) for a combined thermal insulation (MLI) functionality to meet a thermal performance driver of less than 0.5 W/m$^2$ heat flux (assuming a warm boundary of 220 K on orbit) and MMOD debris shielding performance driver of at least 95% probability of no shield penetration for a two-year mission duration at international space station (ISS) orbital altitude. In view of the near-negligible interlayer conductivity radiation, analytical models of this specific embodiment constructed by the inventors predicted 25 times better insulation performance, in terms of heat flux per number of layers, as compared to traditional MLI.

B. Expansion Mechanism

Figure 3A:
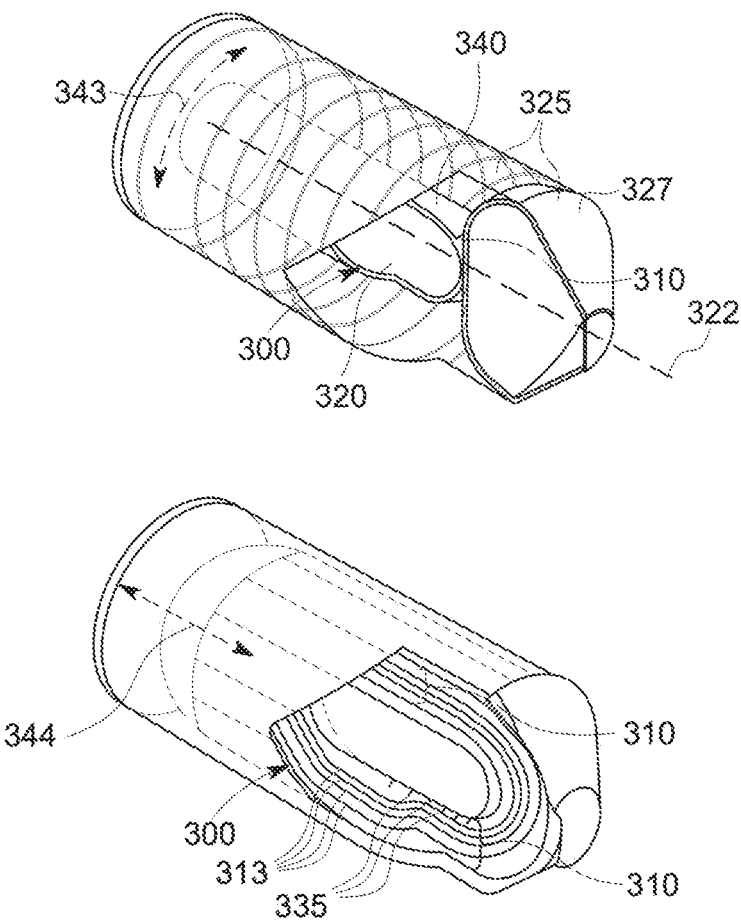
FIG. 3A is a view of an expandable protective system in its packaged state and in its distended state inside an inflatable payload fairing embodiment.

An expandable shell system disclosed herein can be used as a protective system for a cryogenic liquid tank ("cryotank") that simultaneously constitutes the protective system's parent structure and launch vehicle payload. Referring to FIG. 3A and associated detail view 3B, a cryotank parent structure 320 and its expandable protective system 300 are housed within a launch vehicle's payload fairing 325. A payload fairing 325 includes the nose cone 327 used to protect a spacecraft and its payload from the dynamic pressure and aerodynamic heating encountered in flight through an atmosphere. Prior to launch, the expandable protective system 300 is collapsed and securely packaged around the cryotank 320 and within the system's exterior cover 340 (see also 240 in FIGS. 4A, 4B, 5A, and 5B; and 640 in FIG. 6A). One intent of the secure packaging is to minimize the packaged volume of the system 300 while protecting the system 300 from the vibrational, acoustic, and dynamic loads associated with launch and flight of the carrier rocket.

Despite tight packaging within the system's exterior cover 340 (see also 240), a relatively small residual volume of gas can nonetheless be trapped within folds and wrinkles of the collapsed and packaged stack 310 of protective shell layers 313B-313N prior to launch of the carrier rocket. When the rocket launches and climbs higher through the decreasing density of the atmosphere, gases within the rocket's payload fairing 325 vent to the outside atmospheric environment in an effort to maintain a pressure equilibrium with the atmospheric environment. As a result, the residual gas that is trapped within the packaged expandable protective system 300 assumes a positive differential ("gage") pressure relative to the pressure within the fairing 325 thereby distending outermost shell layer 313N from the most internal layer 313A due to gas expansion pressure within the shell layer stack 210 and 310. Referring to FIGS. 2A-2E and 3A-3C, the system's 200 and 300 exterior cover 240 and 340 restrains the pressure within the shell layer stack 210 and 310 throughout the ascent of the rocket through the atmosphere, thereby preventing the stack of shell layers 213 and 313 from distending to their fully expanded configuration.

Figure 3B:
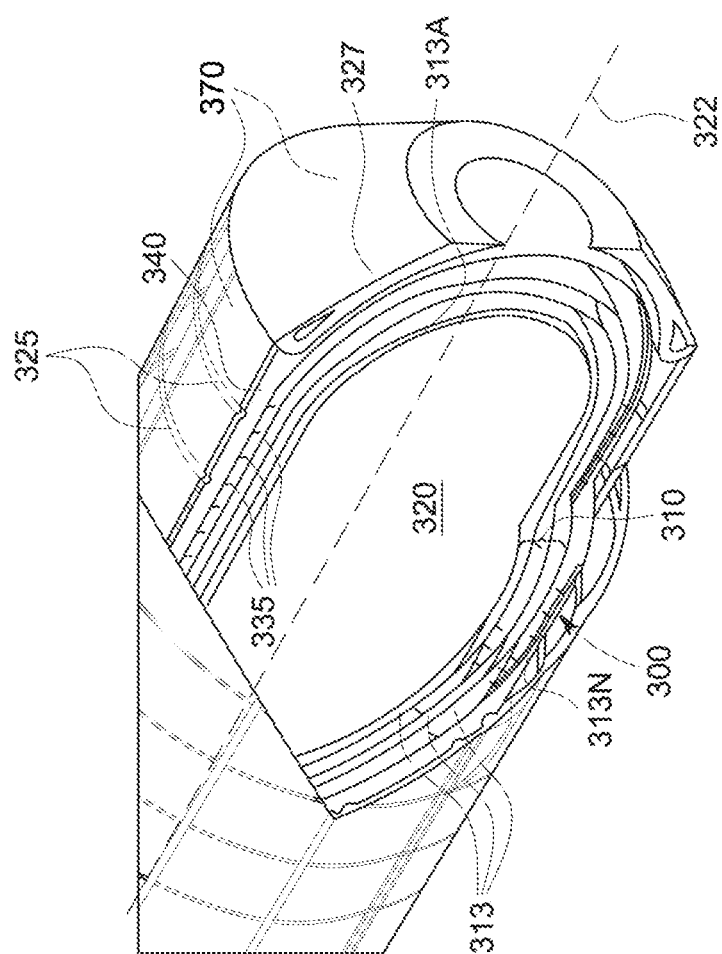
FIG. 3B is a close-up illustration of the expandable protective system in its distended state inside an inflatable launch vehicle payload fairing embodiment.
Figure 3D:
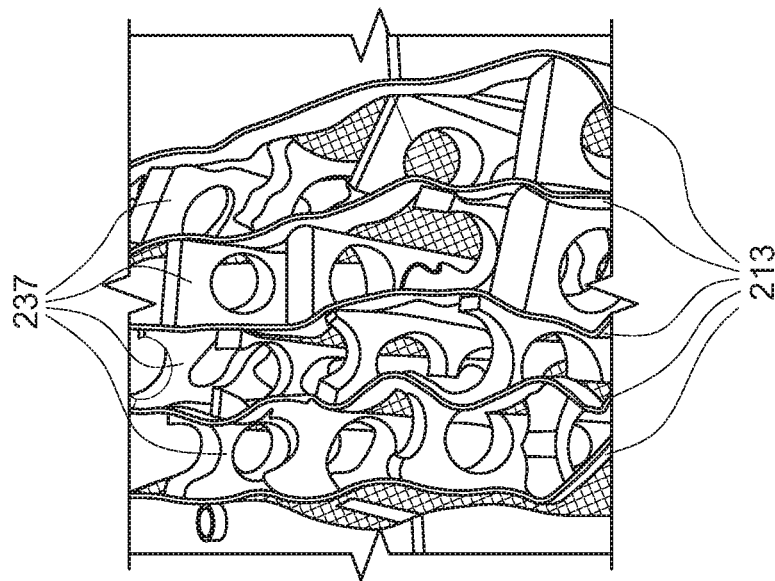
FIG. 3D (prior art) shows traditional compression standoffs between MMOD shell layers for comparison to the connectivity system shown in FIG. 3C according to embodiments of the present invention.
Figure 3C:
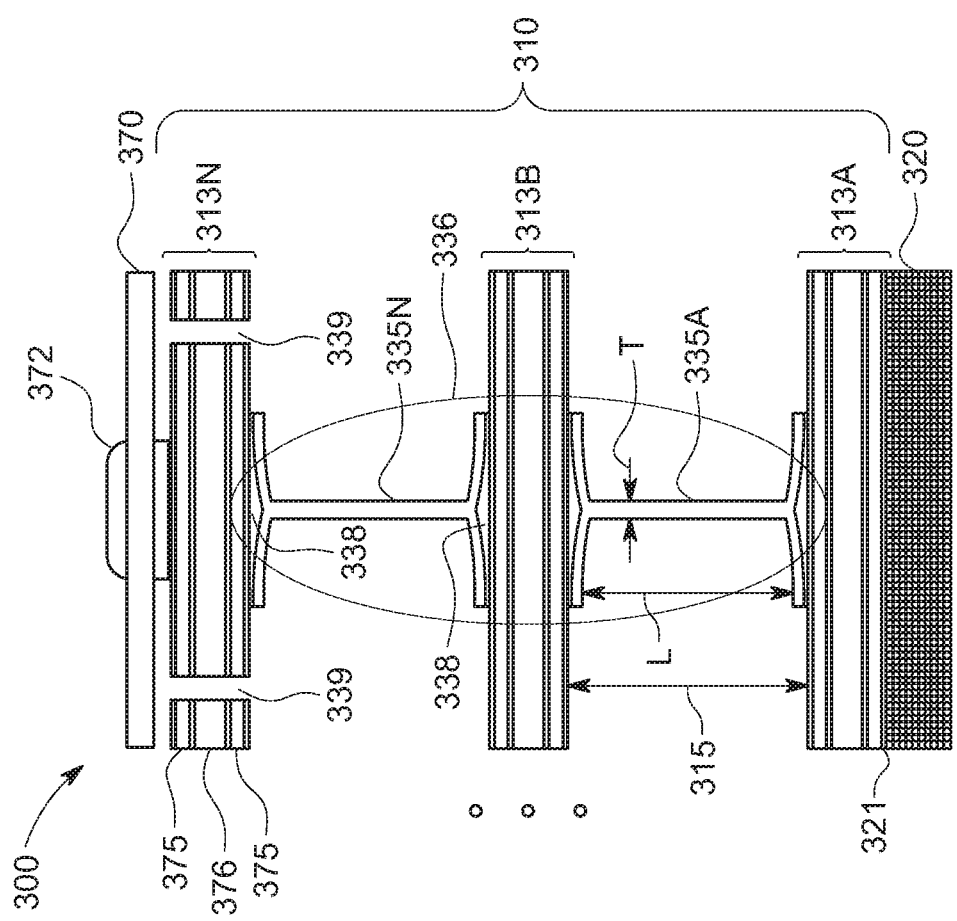
FIG. 3C is a cross-sectional diagram illustrating a tension connector system disposed between shell layers, a batten, and a parent structure.

As shown in FIG. 3C, throughout the ascent phase of the rocket through the atmosphere, vent apertures 339 such as the pictured perforations in the outermost shell layer 313N allow for a gradual venting of a portion of the gas that was originally trapped within the packaged expandable protective system 300 prior to launch. In some preferred embodiments, the rate of expandable protective system 300 venting is calibrated to preclude pressure-induced trauma to the shell layer stack 310 (also applicable to 210), and to the exterior cover 340 (also applicable to 240). In accordance with pressure levels, venting flow rates, timing, and other operational requirements, vent apertures 339 applied to shell layers 213 (see also 313B), and 213N (see also 313N) can take the form of perforations, openings in seam lines, openings in edge close-outs, flaps, tubes or other specifically designed vent paths, pressure release valves, and related mechanisms, active or otherwise. As such, a pressure relief system is provided that can limit or control the differential pressure between the interior volume and the environment outside of the expandable protective system 300. In some preferred embodiments, the base shell layer 213A (see also 313A) and the outermost shell layer 213N (see also 313N) are sealingly connected to form a substantially gas-tight enclosure for the shell layer stack 210 and 310. Such an embodiment can be designed to require only the outermost shell layer to be configured with a pressure relief system such as vent apertures 339 to permit gradual and calibrated venting of the shell layer stack 210 and 310. To attenuate pressure-induced shell loads, the aforementioned embodiment outermost shell layer 213N and 313N can be fabricated of greater strength and/or greater gastightness material than the internal shell layers represented in FIG. 2D by 213B thru 213F and in FIG. 3C by 313B. Complete venting of the disclosed and claimed embodiments may be ultimately achieved by use of such methods to facilitate gradual and calibrated venting of the shell layer stack 210 and 310 which simultaneously results in the expansion of such system 200 and 300.

Referring again to FIGS. 3A and 3B, upon the carrier rocket payload stage's arrival at the intended destination on orbit or elsewhere in space, a release system of the exterior cover 340 is activated thereby allowing the protective system 300 of the current invention to expand. (The release system is described in section "H" and in FIG. 5.) Expansion of the protective system 300 is facilitated by the residual positive gage pressure within the shell layer stack 310. Expansion of the protective system 300 is a controlled dynamic event whereby the pre-expansion positive gage pressure within system 300 is relieved by the expansion of the residual trapped gas into the larger distended volume of the system 300. Upon full distension of the shell layer stack 310, any remaining gas within the stack 310 is passively released through a pressure relief system such as vent apertures 339 to the space environment, leaving the voids between successive protective shell layers 313 at the vacuum pressure level of space required for high performance MLI performance. This passive expansion methodology facilitates distension of the expandable shell layers' 313 protective and insulative system 300 upon release of the exterior cover 340 (applicable to 240 as well) without the need for an active mechanical mechanism, gas storage reservoir, gas generator, or any hazardous pressurant gas gage pressures. Complete distension of the outermost shell layer 313N (e.g. see also 213N) ensures that tension is applied to tension connectors 335 (see also 225) and tension connectors 335A and 335N between any number of successive layers 313 as shown in FIG. 3C, thereby in turn ensuring spacing and full distension of all shell layers 313 outwards from the stack's innermost, or base shell layer 313A (see also 213A) as shown in FIGS. 3A and 3B (see also FIGS. 2B, 2C, 2D).

In some preferred embodiments, the exterior cover 340 (see also 240) is retained after system expansion to provide additional debris, thermal, and/or radiation shielding, or other corollary beneficial attributes in accordance with specific mission requirements. The exterior cover 340 (see also 240) of further embodiments can incorporate features such as flexible radiator panels and/or solar panels that are useful to operation of the parent structure or associated systems and services. Such features are particularly applicable to space exploration architectures such as spacecraft, inflatable habitats, airlocks, shelters, rovers, and storage tanks.

In additional embodiments that are particularly relevant to exploration of space beyond orbital environments, the systems 200 and 300 can be expanded and distended using a mechanical system, compressed gas from a reservoir or from a gas generator or other source of inflation gas. Relative to the vacuum environment of space, or at many celestial bodies, only a very low positive gage pressure is needed for expansion and distension of the protective systems 200 and 300. This translates to a minimal inflation gas requirement for implementation. Following the desired distension, the systems 200 and 300 vent their inflation gas to the vacuum of space, thereafter presenting the same high-performance protective and insulation attributes described herein for other embodiments expanded with passive inflation. This design and implementation approach for protective systems 200 and 300 is particularly applicable to space habitation systems; airlocks; and structures such as containers, storage tanks, and rover vehicles for exploration of celestial bodies.

Multi-functional systems 200 and 300 are hereby provided that can (a) insulate and protect a space vehicle or space borne structure from an external environment, (b) insulate a space vehicle's cryogens from heat sources, (c) protect a vehicle from the high dynamic pressures and the high heat loads encountered in atmospheric flight, (d) provides storage capability that strongly limits, or effectively eliminates, cryogenic boil-off losses once in space, and (d) provide the launch vehicle, spacecraft, space borne structure with protective shielding to counter other forms of radiation besides thermal, as well as the threat of impact with MMOD. Thus, the current invention can alternately be configured to specifically provide high performance thermal insulation, radiation shielding, and/or debris shielding functionality as required. The innovative systems disclosed herein may fulfil any or all of the aforementioned thermal, radiative, and structural protective needs.

C. Free Stream Environment Embodiment

Referring again to FIGS. 2A-F, in additional embodiments the expandable shell system 200 can be installed on the exterior of a launch vehicle, the launch vehicle being the parent structure 220 shown in FIGS. 2A-F. To prevent onboard cryogens such as liquid hydrogen and liquid oxygen from violently evaporating, i.e. "boiling off", the expandable shell system 200 can meticulously insulate containment tank parent structures 220 for the rocket's cryogenic liquids from any source of heat. Examples of such heat sources can include the ambient environment before and after rocket launch, heat from rocket engine exhaust, and aerodynamic heating during flight through the atmosphere. Traditional MLI cannot withstand an aerodynamic wind loading environment as opposed to a more robust solution such as the expandable system 200 disclosed herein. The insulative functionality of the current system 200 can simultaneously incorporate a robust exterior cover 240 (see also 340) that allows the system 200 to withstand the high forces and dynamic pressures associated with the free stream environment of the rocket's ascent phase.

Figure 4B:
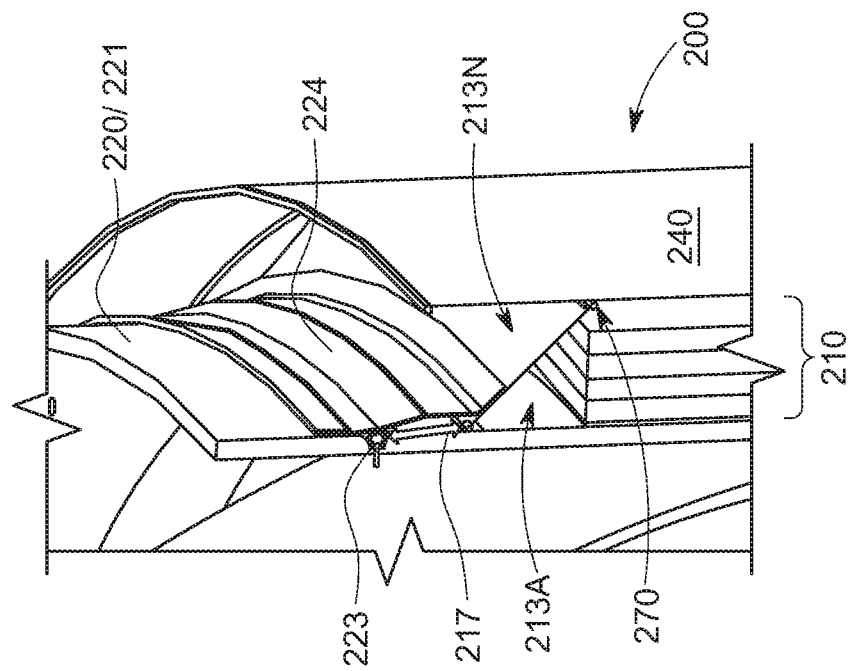
FIG. 4B is a view of the expandable protective system of FIG. 4A in its expanded state on the exterior of the space borne vehicle.
Figure 4A:
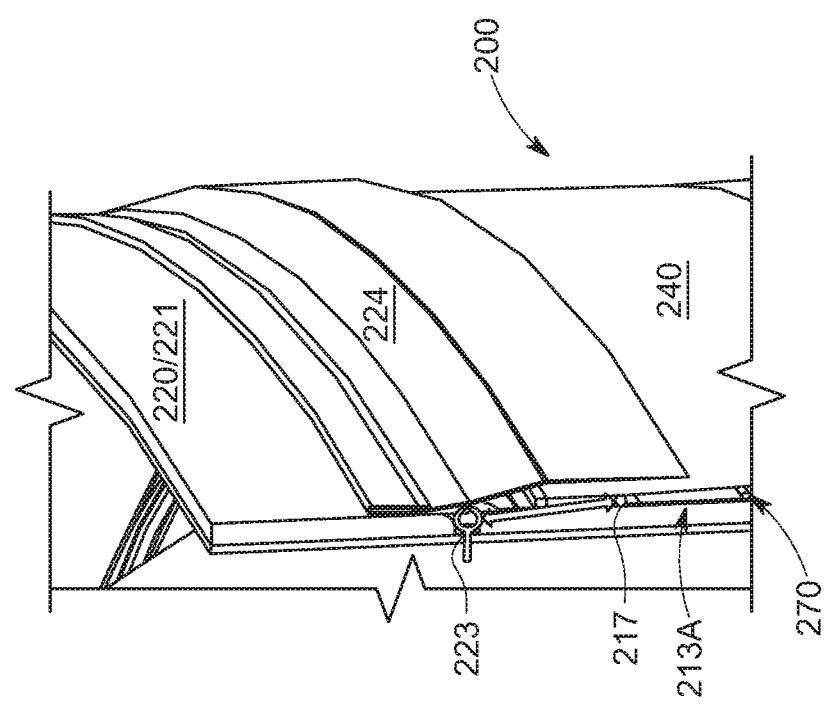
FIG. 4A is an illustration of an example of an expandable protective system packaged on a windswept exterior of a vehicle.

In other preferred embodiments shown in FIGS. 4A and 4B, the system's 200 base shell layer 213A (see also 313A) can incorporate a fastening system 217 that mates with, and connects to, a corresponding anchor system 223 on the outside of the launch vehicle 220. The fastening and connecting systems 217 and 223 ensure that system 200 maintains its installed position relative to the launch vehicle axis 222 and 322 shown in FIGS. 2E and 3A respectively. FIG. 4A shows the system 200 in its collapsed state for flight. FIG. 4B shows the system 200 in its expanded state. Specific design adaptations such as a wind dam 224 can be embedded within the surface or on the outside of the launch vehicle 220 to protect the windward edge of the expandable system 200 from the free stream flow. The system 200 can be expanded and distended at such an altitude where the atmospheric density and free stream environment are sufficiently diminished to preclude aerodynamically induced trauma to the expanded shell system 200.

Compared to traditional insulative alternatives for this application, such as densified foam, the systems disclosed herein such as systems 200 and 300 provide substantially greater thermal protection with reduced mass. Furthermore, the systems 200 and 300 eliminate exposed foam that could slough off as a result of weather, propellant tank icing damage, and/or bird strikes that thereby reduce effectiveness for the remainder of a mission and potentially endanger the launch vehicle.

D. Distension Maintenance System

Figure 2E:
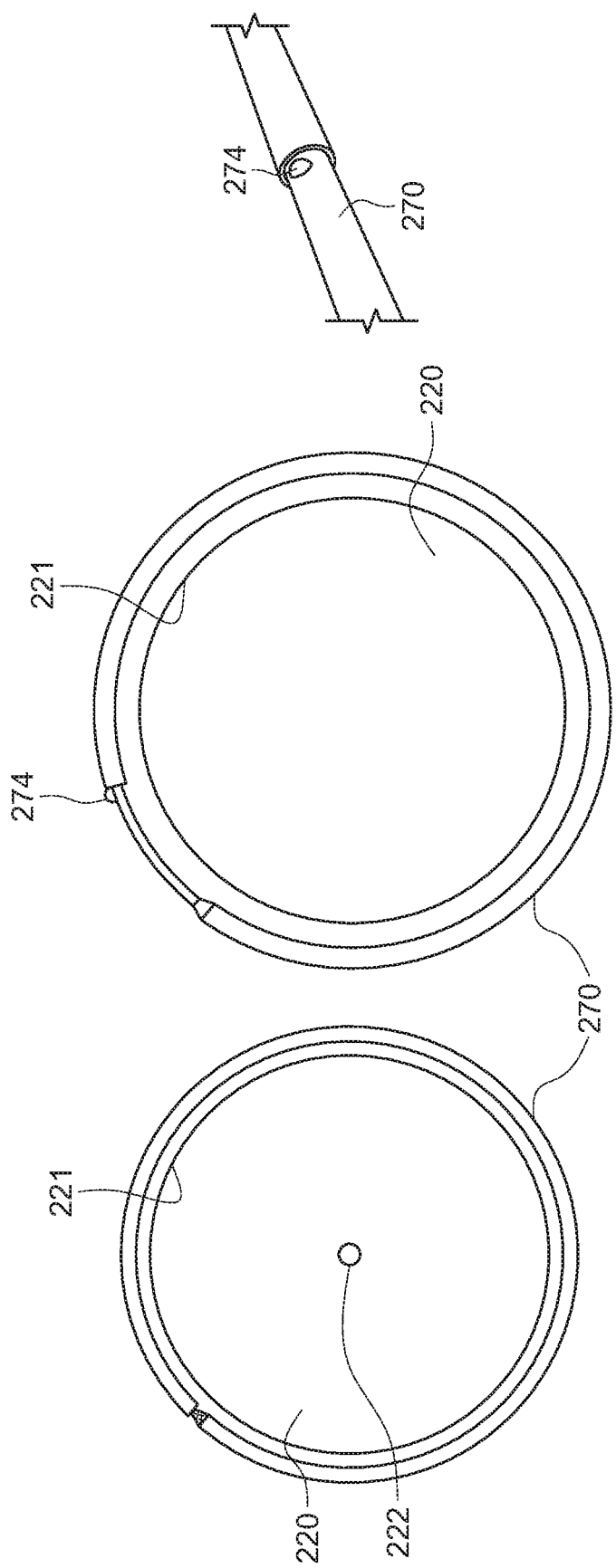
FIG. 2E shows illustrations of a telescoping distension batten.

Upon full expansion and final distension of the shell layer stack 210 and 310, expandable shell systems 200 and 300 can incorporate extendable support members to maintain stable, long-term structural support of the distended geometry of expandable shell systems 200 and 300. Such extendable support members can take the form of telescoping battens in certain embodiments of the present invention. With cross-reference to FIGS. 2B, 2D, 3B and 3C, outermost shell layer 213N and 313N can incorporate telescoping battens 270 and 370 that lie retracted in the collapsed state of the expandable protective system 200 as shown in FIGS. 2A and 2C. These telescoping battens 270 and 370 extend to conform to the dimensions of the fully distended outermost shell layer 213N and 313N as shown in FIGS. 2B, 2D, 3B and 3C. Upon final expansion and full distension of the shell layer stack 210 and 310, the support battens 270 and 370 can lock as shown in FIG. 2E in their extended condition thereby maintaining the dimensions of the distended shell system 200. As such the support battens 270 and 370 can support a passively stable and long-term protective system structural geometry that does not rely on inflation gas, foam spacers, or other compression standoffs, such as standoffs 237 between shell layers 213 shown in FIG. 3D.

Another embodiment takes advantage of the protective attributes of the expandable shell systems 200 and 300 associated with the expanded and fully distended state without the need for the systems 200 and 300 to expand from a collapsed state. Such "pre-expanded" embodiments can simplify systems integration, and eliminate the need for an exterior cover 240, and packaging, compression, and expansion mechanisms. Such embodiments also provide uninterrupted protection of a parent structure 220 and are advantageous in the absence of volume constraints, for example whereby the expanded dimension of systems 200 and 300 are smaller than the internal dimensions of launch vehicle payload fairing into which systems 200 and 300 may be transported.

With cross reference to FIGS. 2D and 3C, the outermost shell layers 213N and 313N can incorporate intermittent batten sleeves 272 and 372 on its outer surface through which the support battens 270 and 370 pass. In some advantageous embodiments, the location of the batten sleeves 272 and 372 on the outer surface of the outermost shell layers 213N 313N can correspond with the attachment points of tension connectors 235 and 335 on the inner surface of the outermost shell layers 213N and 313N, for example as shown by tension connector 335N and shell layer 313N in FIG. 3C. Moving inwards towards the parent structure 220 in FIG. 2D, tension connectors 235 can be radially aligned in an end-to-end fashion between successive shell layers 213 and 313 of the stacks 210 and 310 respectively, to allow radial tension loads of systems' 200 and 300 expansion and distension to be directly transmitted through the entire shell layer stacks 210 and 310 without appreciably loading the individual shell layers 213 and 313. As such, in effect, a continuous radial tension connector structure 236 and 336 comprising an end-to-end connected sequence of individual tension connectors 235 can structurally connect the batten sleeves 272 and 372 with the base shell layers 213A and 313A of the expandable shell structures 200 and 300. The base shell layer 213A (see also 313A) can incorporate reinforcing fabric or fibers, or be locally reinforced, to provide a structurally suitable substrate to which the innermost rank of tension connectors 235A and 335A can be securely connected. Upon final distension of the shell systems 200 and 300, and the subsequent venting of the remaining gas that facilitated original expansion and distension of the expandable shell systems 200 and 300, the now extended and dimensionally locked battens 270 and 370 can apply a direct outward load on the batten sleeves 272 and 372 and the underlying tension connectors 235 and 335 thereby ensuring correct separation 215 and 315 of each concentric internal shell layer 213 and 313 of the stacks 210 and 310.

The support battens 270 and 370 in FIGS. 2A-F and FIG. 3C are pictured oriented in the circumferential sense 343 (see FIG. 3A) of the shell systems 200 and 300. Battens 270 and 370 can also be oriented in spiral fashion or in the meridional sense of the shell systems 200 and 300.

Further to operational requirements, the support battens 270 and 370 can be fabricated from relatively stiff yet lightweight flexible materials, for example pultruded carbon fiber tubing. To maintain their extended geometry after expansion, the support battens 270 and 370 can incorporate any of a variety of "locking" mechanisms 274 such as biased ball locks as shown in FIG. 2E. In some particular embodiments, the support battens 270 and 370 do not require a locking mechanism after systems 200 and 300 expansion, but rather maintain their extended geometry simply by virtue of friction between the extended batten 270 and 370 and the distension-tensioned intermittent batten sleeves 272 and 372 through which the support battens 270 and 370 pass.

Figure 11B:
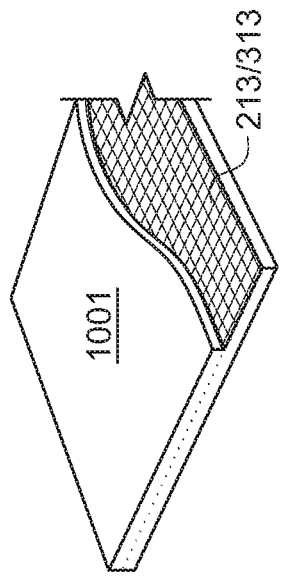
FIG. 11B is a diagram showing a shell layer with a coating.
Figure 11C:
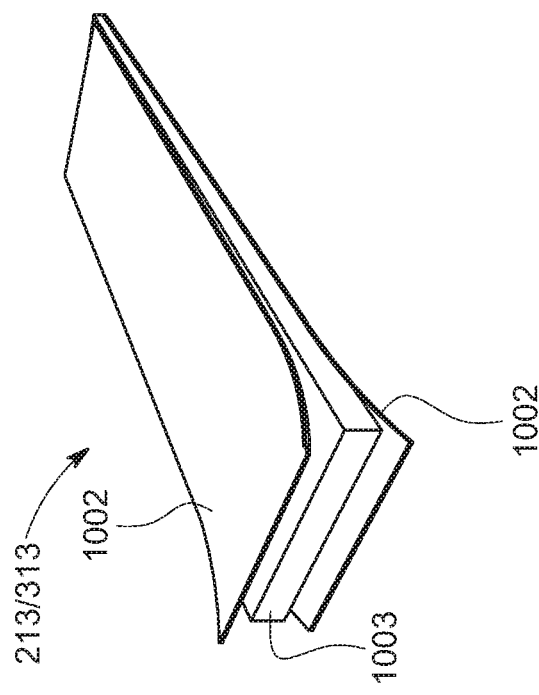
FIG. 11C is a diagram showing a shell layer including a debris shielding material laminated with cladding layers.
Figure 11A:
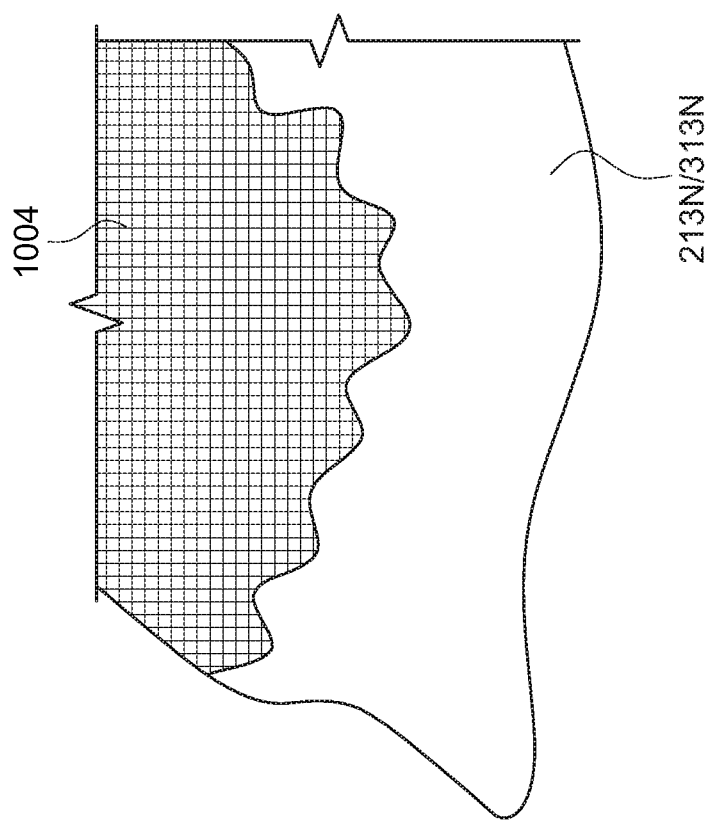
FIG. 11A is a diagram showing an outermost shell layer with a rigidizing coating.

Referring to FIG. 11A, to maintain the distended geometry of expandable systems 200 and 300, an alternate embodiment of the current invention can dispense with extendable support members by incorporating rigidizing media 1004 such as resins and/or adhesives in the exterior cover 240 and 340 or outermost shell layers 213N and 313N of systems 200 and 300. The rigidizing media 1004 can activate upon expansion of systems 200 and 300 and subsequently cure and harden upon exposure to prescribed environmental factors such as ultraviolet light thereby maintaining system 200 and 300 distended geometry.

A different expansion and distension mechanism of shell systems 200 and 300 than the use of gas can be provided by an embodiment whereby the batten sleeves 272 and 372 of outermost shell layers 213N and 313N of the embodiments 200 and 300 can incorporate battens 270 and 370 respectively of sufficient stiffness and/or spring tension to, upon exterior cover 240 and 340 release, facilitate distension of the shell layer stack 210 and 310 without the need for the earlier described trapped gas distension mechanism.

E. Collapsible Expandable Parent Structures

Figure 6A:
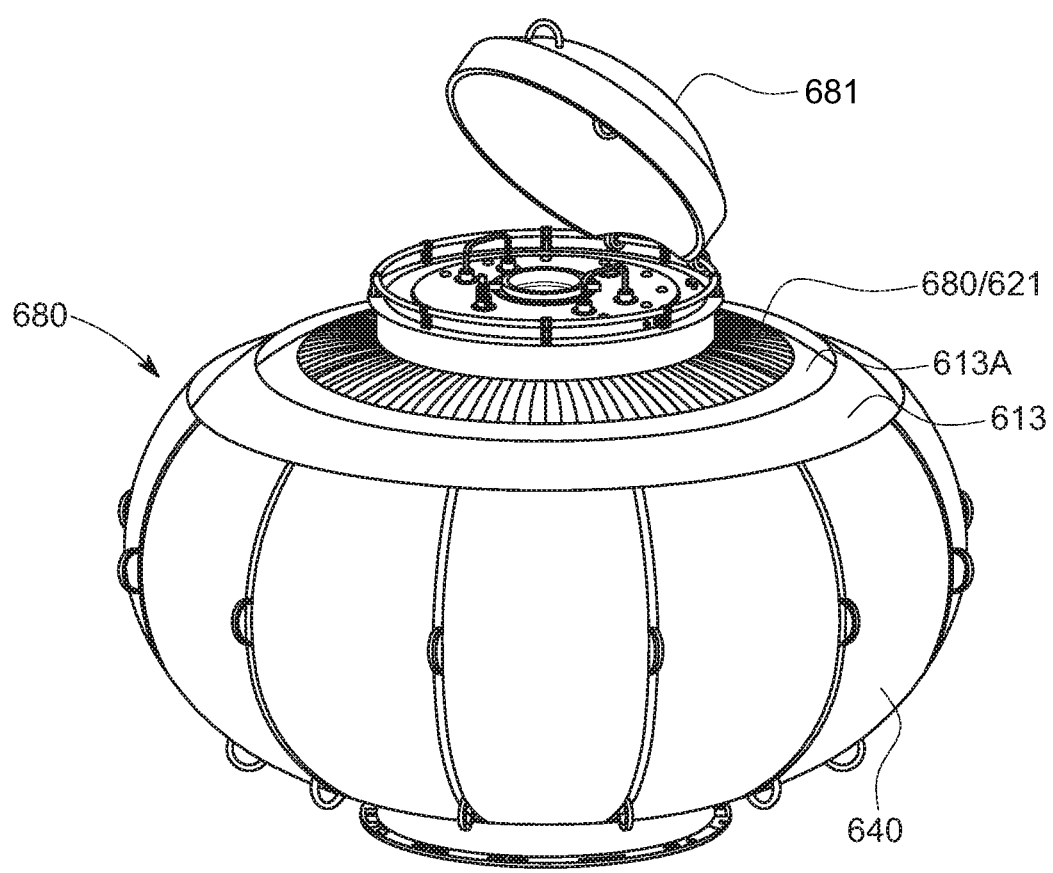
FIG. 6A is a view of a a parent structure with the collapsible/expandable system in its distended state.

Like the herein described expandable shell system, collapsible parent structures can be collapsible and expandable according to the teachings disclosed herein. An example of such a collapsible/expandable parent structure 680 is the inflatable space habitable structure shown in FIG. 6A. The example embodiment of such collapsible/expandable parent structure 680 pictured in FIG. 6A is an inflatable airlock to support astronaut Extra-Vehicular Activity (EVA) by means of the pictured EVA hatch 681. FIG. 6A also shows the OML 621 of the expanded parent structure 680, as well as the base shell layer 613A, an internal shell layer 613, and exterior cover 640 of the expandable parent structure 680. Further examples of collapsible/expandable parent structures 680 are collapsible/expandable shelters, storage tanks, and propellant tanks.

As graphically shown in FIGS. 6B and 6C, an embodiment of the expandable shell system 600 can protect such collapsible parent structures 680 with multifunctional thermal and debris shielding attributes by virtue of the flexibility of the protective layer stack 610, such as previously described for example. With particular attention to FIG. 6B, the collapsible/expandable parent structure 680 can include folds, pleats, constrictions, and/or other collapsible features 635 so as to be expandable from the collapsed state shown in FIG. 6B to the expanded state shown in FIG. 6C where the collapsible features 635 of the expandable parent structure 680 and shell system 600 of FIG. 6B have been unfolded, distended, or expanded as shown in FIG. 6C. As shown in FIG. 6B, the expandable shell system's 600 ability to be collapsed with folds and pleats 616 allows the shell system 600 to occupy minimum volume in concert with the diminished collapsed and packaged dimensions of collapsible/expandable parent structures 680.

The expandable shell system 600 for a collapsible/expandable parent structure 680 can be expanded and distended by means previously described. However, in this application, one example of a preferred embodiment of the shell system 600 configurationally and dimensionally conforms to the collapsed parent structure 680, whereby the shell system 600 features distension maintenance battens 670 that can be tightly coiled around the collapsible/expandable parent structure 680 as schematically shown in FIG. 6B. FIG. 6C shows the distended configuration of the packaged collapsed configuration shown in FIG. 6B. Low-friction batten sleeves 672 can facilitate reduced friction resistance expansion of the coiled battens 670. Battens 670 can be securely attached to an individual batten sleeve 672 to ensure correct circumferential positioning of the support batten at time of shell system 600 expansion. In a preferred embodiment, batten 670 is attached at its approximate center to a batten sleeve thereby minimizing the distance batten 670 needs to slide through its associated batten sleeves 672 at time of shell system 600 expansion. Depending on parent structure 680 packaging requirements or other design drivers the coiled battens 670 can assume different orientations such as circumferential, axial, or spiral with regard to the axes of the parent structure 680.

F. Tension Connectors

Figure 1A:
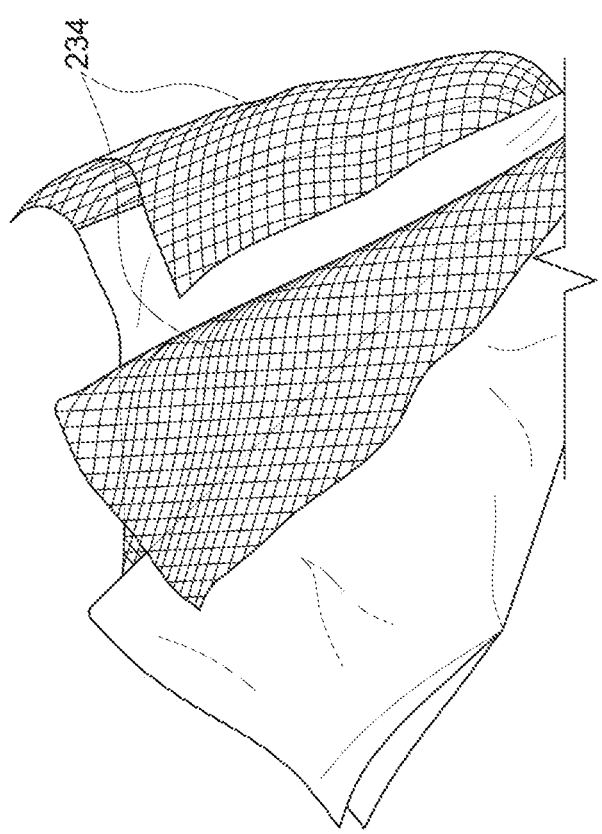
FIG. 1A (prior art) is a simplified diagram of traditional multi-layer insulation (MLI)

Referring again to FIG. 2D in further detail, the individual shell layers 213 of the expandable shell system 200 can be mutually connected by tension connectors 235 as previously discussed, whereby the shell layers 213 are expanded in tension as a result of distension of the outermost shell layer 213N. Conventional multi-layer insulation (MLI) blankets are an assembly of a large number (commonly 20 or more) of thermally reflective, foil-type shell layers as shown in FIG. 1A. The thermal efficiency of conventional MLI blankets requires all constituent layers to be separated from adjacent layers by full coverage fabric scrim 234 (see FIG. 1A). As shown in FIG. 3D, other traditional MLI designs, particularly those providing MMOD shielding functionality, require foam spacers 237 or other compression resistant standoffs to facilitate the accurate spacing required for debris shielding functionality, and/or to preclude contact between adjacent layers 213 to eliminate the potential for thermal "shorting" that would render the MLI insulation ineffective. In direct comparison, the implementation of the tension connectors 235 (see also 335 in FIG. 3C) according to embodiments disclosed herein can be packaged for launch as shown in FIG. 2A (see also FIGS. 3A, 4A, and 5B) and expanded without impact to launch vehicle performance. Traditional MLI systems cannot be compressed in the fashion of such innovative designs disclosed herein without performance degradation of the traditional MLI systems. As such, the expandable shell systems disclosed and claimed herein can exhibit improved compatibility with critical launch vehicle performance factors over the use of traditional MLI insulation and MMOD protective shielding.

As opposed to the conventional spacer fabrics and stand-off elements, the tension connectors 235 and 335 of the current systems 200 and 300 respectively exhibit several vast improvements over conventional MLI functionality by virtue of, for example, (a) the relatively large distance between adjacent shell layers 213 and 313, and (b) the minimal structural capability and distribution density (i.e. large spacing) of tension connectors 235 and 335 required to maintain spacing of the shell layers 213 and 313. Furthermore, the tension connectors 235 and 335 need only support small tensile loads during system expansion and after distension of the protective shell layer respective stacks 210 and 310. As such, the tension connectors 235 and 335 of the current expandable shell systems 200 and 300 have a much higher ratio of length to cross-sectional thickness and width than conventional spacer materials. This higher ratio of length to cross-sectional thickness and width greatly reduces parasitic conduction heat loads, and results in determinate, radiation dominated heat transfer. For example, the length L of the tension connector can be at least 100 times larger, for example 375 times larger, than the thickness T of the tension connectors 235 and 335. The effective result of the preceding is that the tension connectors 235 and 335 of preferred embodiments assume a gossamer, ribbon-like form. Example materials for tension connectors 235 and 335 are high specific strength, high modulus plastic films such as polyimides KAPTON or UPILEX, or biaxially-oriented polyethylene terephthalate (BoPET) such as MYLAR.

To illustrate, certain embodiments of expandable shell system 200, but also applicable to embodiments of expandable shell system 300, can have an example tension connector 235 (see also 335) length of 2.54 cm (1.0 inch) with a thickness of 0.01 cm (0.004 inch) and corresponding cross section of only 0.026 $cm^2$ (0.004 $in^2$). Such expandable shell systems 200 and 300 can provide better thermal protection than traditional MLI while using fewer layers, and also better performance than so-called Integrated Multi-Layer Insulation (IMLI). IMLI is an MLI design that relies on compression resistant polymer spacers to maintain shell layer separation, but in doing so precludes system collapsibility for efficient packaging. The requisite large number of polymer spacers furthermore reduces IMLI performance compared with the virtual elimination of conduction as a contributing mode of heat transfer in the herein described expandable shell systems 200 and 300. The virtual elimination of conduction in systems 200 and 300 also results in an analytically determinate system which can be confidently designed without costly iteration between manufacturing and verification testing.

In application, and as shown in FIGS. 2C and 2D, a finite number of tension connectors 235 results in a faceted overall effect on the distended internal shell layers 213 and outermost shell layer 213N. For a given areal distribution of tension connectors a minimum number of shell layer 213 facets are required to prevent contact of the base shell layer 213A with an internal shell layer 213. Such contact would result in a thermal "short" reducing effectiveness of the insulation. Sixteen such facets and the associated distribution of tension connectors 235 are shown in FIG. 2C. Similar axial distribution of tension connectors 235 results in an example approximate areal distribution of only 1.7 tension connectors 235 per square meter of parent structure 220 outer surface 221 area. The FIG. 2C detail view shows an embodiment design of six shell layers 213 that allow a 20% thermal margin for losses associated with penetrations, end of life (EOL) properties, and other uncertainties.

A detail view of tension connectors 235 is provided in FIG. 2D detailing connection of tension connectors 235 (see also FIG. 3C) to either side of each protective shell layer 213. In view of low-load structural requirements that are only tensile in nature, tension connectors 235 can be fabricated from ribbon-thin yet high-strength and high-modulus polymer film. The close-up view of FIG. 2D on the left also shows the connection points of the outer ranks of tension connectors 235 with the batten sleeves 272 through which battens 270 pass. In the enlarged view of FIG. 2C on the right, a series of circumferential battens 270 are visible which extend along the length of the parent structure 220. Thermal analysis conducted by the inventors of this patent application demonstrated that, due to the large relative spacing and extremely small cross-sectional area of tension connectors 235, performance optimization of the current invention presents significant design latitude in placement, construction, and spacing of the tension connectors 235.

G. Debris Shielding

To provide details regarding debris shielding, expandable shell embodiments 200 and 300 can include one, more, or all of protective shell layers 213A-N and 313A-N of the current expandable shell systems 200 and 300. As indicated in FIG. 11C, each, all, or any of shell layers 213A-N and 313A-N can incorporate debris shielding materials 1003, that may include fibers, and coatings, such as shear-thickening resins, ceramic or glass fiber-based fabrics, and/or fabric woven from high-modulus debris shielding fibers such as liquid crystal polymer VECTRAN, liquid-crystalline polyoxazole ZYLON, aramids TECHNORA or KEVLAR, or ceramic fiber such as NEXTEL™. As shown in FIG. 11B, the protective shell layers 213A-N and 313A-N of other embodiments can incorporate a coating 1001 on one or both sides, for example through vapor deposition of aluminum (VDA) metal or, as shown in FIG. 11C, with a cladding layer 1002 of plastic film or metal foil to produce a multifunctional shield layer 213A-N and 313A-N providing tailored thermal, or debris protection, or a combination of both protections. Material selection may be based on many factors and requirements. In particular embodiments of the expandable shell systems 200 and 300, the shell layer 213A-N and 313A-N materials and fabrics can be laminated on one or both sides with one or more plastic films such as polyimides KAPTON or UPILEX, or biaxially-oriented polyethylene terephthalate (BoPET) such as MYLAR. Selection of shell layers 213A-N and 313A-N materials can be made to also enhance other parent structure 220 needs such as radiation protection.

H. Exterior Cover, Compression System & Release System

Referring again to FIGS. 4A and 4B, several embodiments may further include the exterior cover 240 that maintains the multi-layer stack 210 of protective shell layers 213A-N packaged and restrained in its collapsed configuration, for example during transport or during carrier rocket launch, ascent, and flight, but whereby the exterior cover 240 can also be released, and if desired, partially or entirely jettisoned at time and location of expansion of the expandable shell system 200. The highly advantageous flexibility of the ribbon-like tension connectors 235 (see FIG. 2D) that connect successive protective shell layers 213 to one-another does not impede compression and packaging of the stack 210 of shell layers 213 and allows the tension connectors to advantageously conform to the reduced dimensional geometry of the collapse state of the expandable shell system 200.

Referring again to FIGS. 5A and 5B, the exterior cover 240 can also incorporate a compression system that can include a plurality of integrated compression straps 255 that permit tightening of the exterior cover 240 using tensioning buckles 257. The compression system aids in packaging of the expandable shell system 200 by substantially conforming the stack 210 of protective shell layers 213 to the dimensions of the OML 221 of the parent structure 220 as shown in FIG. 5B. The compression straps 255 can also feature a "stopper" which redundantly defines the prescribed packing circumference of the shell system 200 around the parent structure 220, and furthermore precludes trauma to the shell system 200 or the parent structure 220 due to over-tensioning of the exterior cover 240. The tensioning buckles 257 and compression straps 255 can be removed after shell system 200 packaging in some such embodiments.

The exterior cover 240 can further incorporate a release system as shown in FIG. 5B. The release system shown in FIG. 5B incorporates mechanically interlocking, releasable, and re-closable features of the types shown in FIGS. 5C and 5D, including grommets 265, release pins 267, or other like connectors for securing and releasing the exterior cover 240. Such release systems and methods may be similar or the same as release systems in many arts, such as parachute packaging and deployment.

Once again referring to the embodiment illustrated in FIGS. 5A, 5B, 5C, and 5D, when a specified compressed dimension is reached using the tensioning buckles 257, release pin loops 266 appear in grommet 265 holes, or "windows," to receive the release system pins 267 in a fashion well-known in the parachute industry. The inventors have also found proven convenience, versatility, ease of installation and closure of the exterior cover 240, as well as compression and release predictability by using military specification methods and hardware in testing.

At time of shell system 200 expansion, the compression system releases the restraining aspect of the exterior cover 240 thereby allowing the expandable shell system 200 to expand and achieve its distended state. Release can be triggered by redundant pyrotechnic cutters or by other well-known space-deployable technology means. In one embodiment of the release system, pyrotechnic cutters can sever a tensioned release cord 268 that thereafter recoils to pull the release pins 267 from their respective pin loops 266.

Distension of the shell layer stack 210 can be facilitated by methods and systems previously described in detail. Also, as previously described in detail herein, a distension maintenance system such as locking battens 270 and 370 can be implemented upon full expansion of the protective system's 200 multi-layer stack 210 of protective shell layers 213, thereby maintaining the distended state of the expanded stack of shell layers 213.

As shown in FIG. 5A, a design embodiment that simplifies packaging of the expandable shell system 200 can include a dimensionally oversized exterior cover 240 which can be loosely wrapped around the folded assembly of the expandable shell system 200 and subsequently tightened with the earlier described compression system shown in FIGS. 5A-D. In some advantageous embodiments, the exterior cover 240 (see also 340) can be fabricated of lightweight, dimensionally stable fabrics and films to allow sufficiently tight packaging of the shell layer 213 stack 210 to resist potentially damaging spacecraft dynamic launch and flight loads, and the positive gage pressure that develops within the packaged shell layer 210 stack during atmospheric flight. For example, the exterior cover 240 shown in FIGS. 5A and 5B can be fabricated from a fabric that is woven from fibers that are simultaneously of high specific strength, high modulus, and are resistant to high temperature. Example fibers may be of glass, carbon, ceramic such as NEXTEL, liquid-crystalline polyoxazole such as ZYLON, or aramid such as TECHNORA. In further advantageous embodiments the aforementioned fabric may be treated with heat resistant coatings or films that may also assist in maintaining cover 240 fabric integrity and provide surface finishes resistant to aerodynamic forces. Example coatings may include silicone, or fluoropolymers such as Polytetrafluoroethylene (PTFE), Perfluoroalkoxy Alkane (PFA), or Fluorinated Ethylene Propylene (FEP). An example heat resistant film that can be incorporated in exterior cover 240, 340 embodiments is polyimide such as Kapton.

Figure 2F:
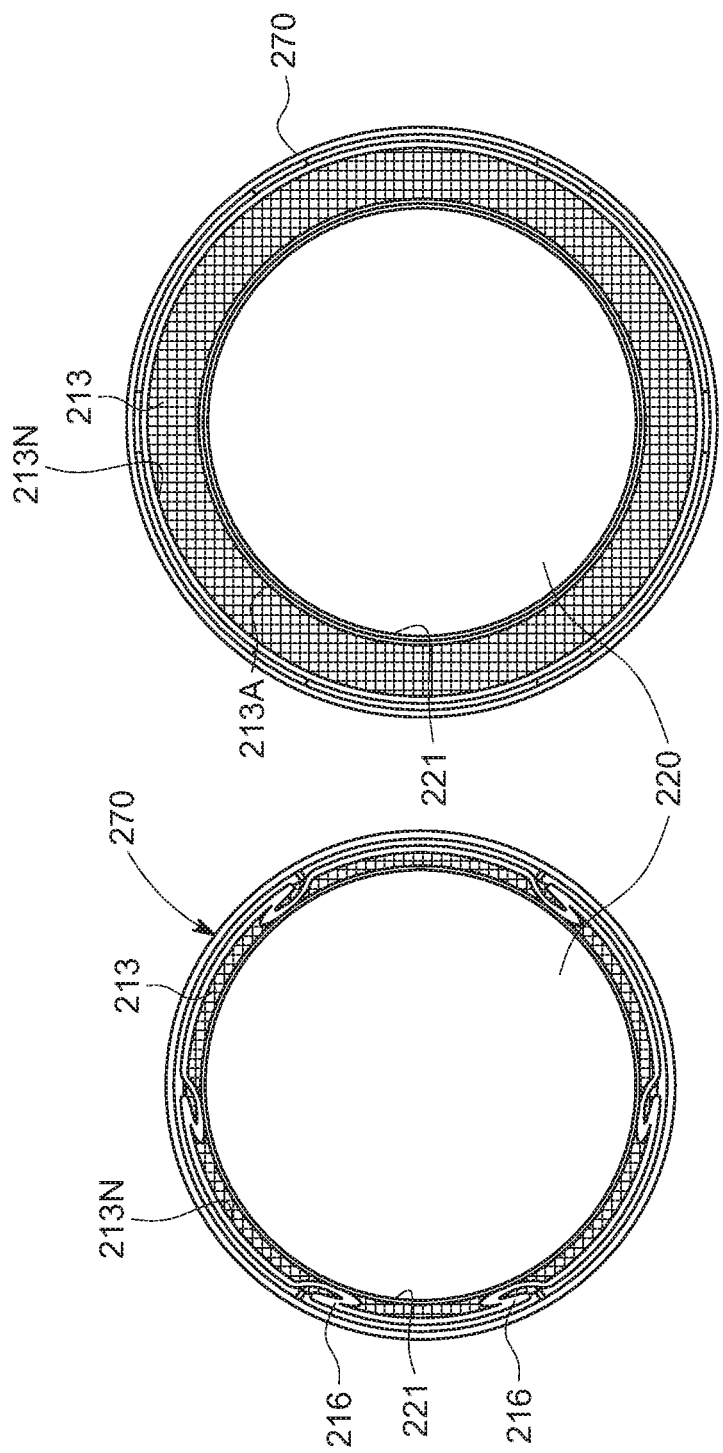
FIG. 2F shows diagrams schematically illustrating distension of the expandable protective system from its collapsed state to its distended state.

As schematically illustrated in FIGS. 2A and 2F, and as shown in FIGS. 5A and 5B, the excess in circumferential material of the collapsed shell layer stack 210 can be captured in longitudinal pleats 216 to facilitate packaging of the expandable shell system 200. Gaps between the segments (e.g. six segments are distributed around the circumference of shell system 200 in FIG. 2A) of the exterior cover 240 (see also 340) are defined and bounded by the meridional 244 ranks of batten sleeve 272 (see also 372) placements which dictate the pleat 216 fold line locations. The resulting circumferential 243 "reduction" of excess material (and dimension) of the shell stack 210 can be complemented by a similar reduction, this time in the meridional 244 sense, of the excess shell stack 210 material enveloping of parent structure 220 end caps 218 (see FIG. 8B).

FIGS. 2A and 2B illustrate such expansion of the shell stack 210, from its packaged and restrained state in FIG. 2A, to its expanded, minimally pressurized, and finally vented and batten stabilized embodiment shown in FIG. 2B. The tautness of each of the shell layers 213 is seen in FIG. 2B and is indicative of successful expansion of expandable shell systems 200. FIG. 2F provides another schematic depiction of expansion of the shell stack 210 from its packaged and restrained state on the left in FIG. 2F to its expanded state shown on the right of FIG. 2F.

Another benefit of the herein described compression system of the expandable shell systems 200 and 300 is its ability to attenuate the dimensional and physical discontinuities of the packaged systems 200 and 300 and to provide more precise packaged dimensions. The robust dimensional stability of the preferred pressure restraining embodiment of the shell systems 200 and 300 exterior cover 240 and 340 of the herein disclosed compression system design approach can also constrain protrusions and other irregularities of the collapsed shell layer stacks 210 and 310. Each compression strap 255 shown in FIGS. 5A and 5B can cinch down to define the same, or locally requisite, prescribed packaging circumference regardless of location and regardless of the tension force required to locally compress the system 200. As such, locations of problematically bulging contents are readily identified. Tensioning buckles 257 can be locally loosened, or release pins 267 altogether removed, to allow manipulation and optimized realignment of the packaged contents. However, other embodiments may require the exterior cover 240 and 340 to be geometrically discontinuous or segmented to adapt to non-uniform or otherwise specific packaged content geometry.

The compression system hereby provides a substantially geometrically uniform exterior cover 240 and 340 surface of the expandable shell system 200 and 300. According to such embodiments, compression load is applied where most needed thereby deflecting protruding features laterally to adjacent cavities. This is especially advantageous to assist and facilitate compression, packaging, and expansion of the collapsible and expandable parent structures described earlier herein.

Embodiments of the exterior cover 240 and 340 can also incorporate low coefficient of friction fabrics, films, or coatings such as the earlier described fluoropolymers to readily slide over the exterior surface of the collapsed shell layer stack 210 thereby reducing frictional trauma and easing shell stack 210 compression for packaging. Such embodiments also benefit "clean" separation of the exterior cover 240 and 340 at time of system 200 and 300 expansion.

I. Protective System Installation

Embodiments disclosed herein can deliver an integrated, form-fitting multi-functional protective (e.g. thermal and/or impact protection) system. Unlike conventional protective methods such as MLI blankets, the expandable protective systems 200 and 300 can offer thermal and other radiation protection, debris shielding protection, or thermal, radiation, and debris shielding protection simultaneously.

Compared with conventional MLI systems, fabrication costs of herein disclosed expandable shell systems can be reduced through reduction in blanket shell layer count and grounding strap infrastructure. Installation cost, a major component of total system budget, is also reduced by eliminating the need for technicians locating, fitting, and installing numerous individual blankets of traditional MLI over curved surfaces while working from platforms suspended over critically sensitive flight hardware. The expandable protective systems disclosed herein can improve reliability and predictability of installation by requiring fewer mechanical operations. The quality control inspection process is commensurately simplified, and protective system performance enhanced.

Various embodiments of the systems disclosed herein can eliminate the numerous challenges associated with conventional protective technologies by providing continuous single piece individual shell layers through computer-assisted operations in the cutting and seaming activities of the individual shell layers. Seam closure alignment tabs can be accurately located and cut to facilitate precise seam closure for each individual shell layer.

With reference to FIGS. 2A-2F, and the expandable shell system 200 to illustrate, the complete stack 210 of the expandable protective system's 200 shell layers 213 can be fabricated as a single, open, jacket-like assembly that can be wrapped around the parent structure 220 for installation. Each individual shell layer 213 is thereafter sequentially closed around the parent structure 220, starting with the base shell layer 213A. Although assembly and installation activities will require trained technicians, the proposed design is less susceptible to human error induced performance degradations than conventional MLI designs. Furthermore, the characteristic open architecture of the herein disclosed embodiments including spaced shell layers 213A-N (see also 313A-N) readily facilitates visual inspection of the expandable protective system 200, both during fabrication and assembly, as well as after system build. Thermal shorting contact between traditional adjacent shell layers of conventional MLI blanket designs is difficult to verify after assembly, whereas shell layer 213 contact is readily visually verifiable in various designs of the current invention. Thus, while traditional MLI blankets require significant customization, "touch labor", testing, and inspection, expandable shell systems disclosed herein can provide reliable quantified performance at reduced cost.

Still referring to expandable shell system 200 to generally illustrate system functionality and performance, the support structures, plumbing, and other external elements and discontinuities associated with parent structure 220 integration requirements can pass through the expanded protective shell system 200 with minimal impact to system's 200 performance since pass-through penetrations do not cause thermal shorts between the shell layers 213. To avoid thermal shorts, compression (with associated parasitic heat exchange), and to accommodate the aforementioned parent structure 220 integration complexities, the architecture of the current invention can incorporate conventional star-cut perforations in the individual radiation shields, conical shapes, flaps, or shutter mechanisms of the example types implemented on the James Webb Space Telescope and on proposed configurations of orbital cryogenic propellant depots. These adaptive configurations allow maximum thermal and debris protection to be provided to the full surface area of the parent structure 220.

The protective system 200 disclosed herein can be an independent free-floating structure that does not require extensive attachment to the parent structure 220. The system 200 can attach to available parent structure 220 surfaces at the end caps 218 and can be positionally restrained at parent structure 220 structural integration locations and plumbing penetrations thereby providing support to the protective system 200 during ground handling, launch, and flight.

According to certain non-limiting specific actual embodiments applied by the inventors to a cryogenic tank parent structure 220 as shown in FIGS. 2A and 2B, only six (6) shell layers would be required (including 20% performance error margin) for a combined thermal insulation (MLI) functionality to meet a thermal performance driver of less than 0.5 W/m$^2$ heat flux (assuming a warm boundary of 220 K on orbit) and an MMOD debris shielding performance driver of at least 95% probability of no shield penetration for a two-year mission duration at international space station (ISS) orbital altitude. In view of the near-negligible interlayer 213 tension connector 235 conductivity, thermal models of this embodiment constructed by the inventors predict 25 times better insulation performance as compared to traditional MLI.

This illustrative embodiment required only 0.25 mm (0.01 in) of cryotank wall thickness to absorb the dispersed energy of fragmented MMOD after impact with the expandable protective system 200—a value which is a rough order of magnitude less than the thickness required by the conventional Whipple shield design. This embodiment represents a significant mass and performance improvement over the previous state of the art. This particular design is furthermore ideally suited for protection of both the central cylindrical portion of a cryotank parent structure 220 as well as the tank end caps 218.

The mass "overhead" burden of the non-protective batten 270 and tension connector 235 elements of the tested shell system 200 may be only 15% of the mass of the combined MLI and MMOD shell layers 213. 57% of the system's 200 mass pertains to MMOD shielding functionality, 4% to MLI, and notionally 24% to the pressure restraining exterior cover such as elements 240 and 340. The areal density of the individual shell layer 213 offering combined MLI and MMOD design protection was approximately 360 g/m$^2$ (10.6 oz/yd$^2$). This is only one example of a current design and other solutions and designs are anticipated under the teachings of this document.

Continuing to refer to expandable shell system 200 to illustrate, parasitic thermal conduction through the expandable shell system's 200 concentric shell layer 213 construction is almost exclusively through the tension connectors 235 connecting adjacent shell layers 213. Thermal conduction between adjacent shell layers 213 through the connecting tension connectors 235 is near-negligible due to (a) the low conductivity of the material, (b) the small cross-sectional area of individual tension connectors 235, (c) the relatively large distance between shell layers 213 desired for optimum MMOD protection functionality—and hence large tension connector 235 length, and (d) the relatively small number of tension connectors 235 needed to maintain system 200 geometric definition and stack 210 shell layer 213 spacing.

Figures 7A, 7B:
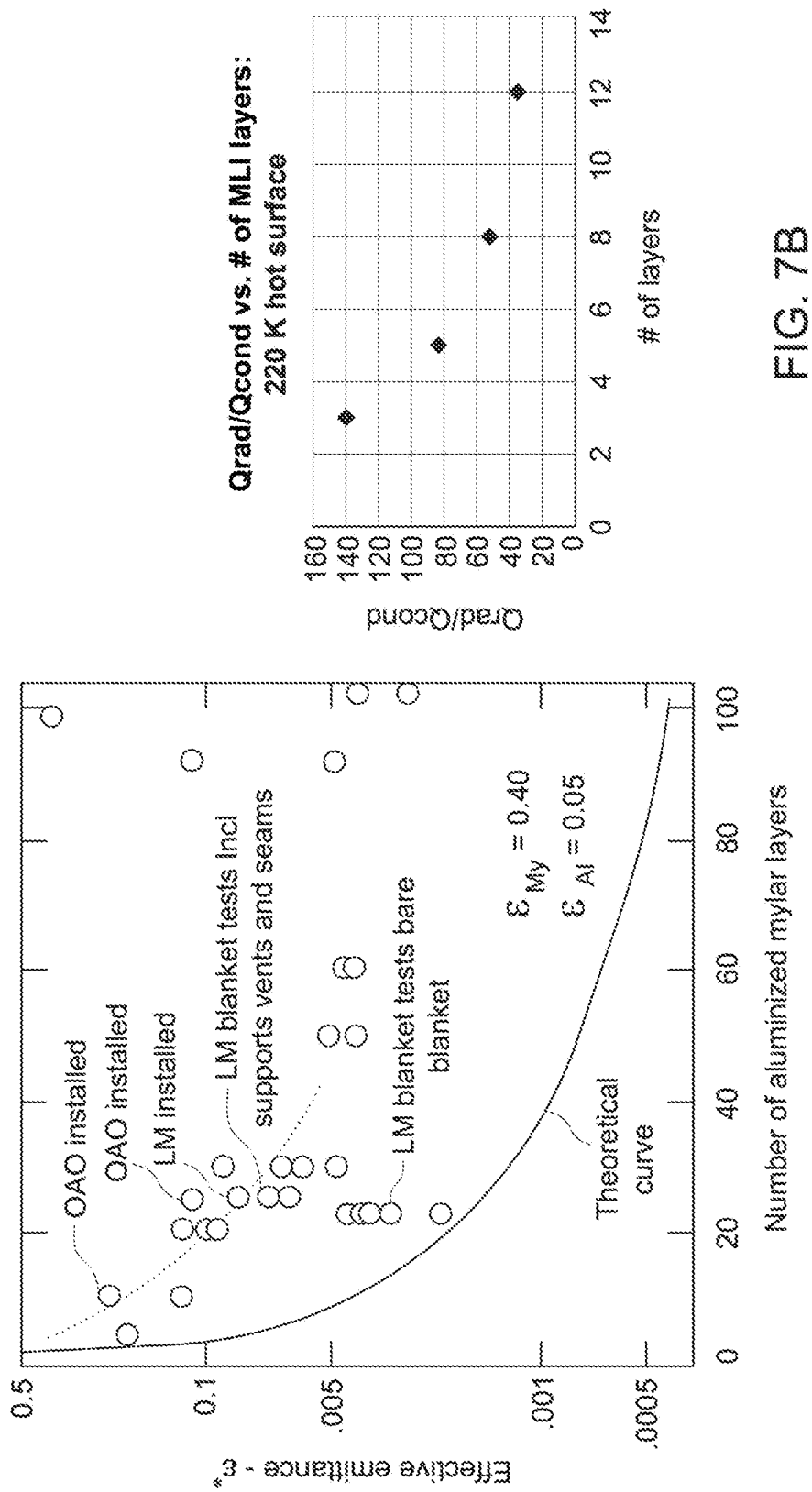
FIG. 7A (prior art) illustrates performance degradation of traditional MLI over ideal performance.
FIG. 7B illustrates heat flux as function of the number of protective shield layers as measured for examples of embodiments of the present invention.

This thermal radiation dominated performance of the expandable shell system 200 has important implications as designed and tested by the named inventors. The system 200 nearly eliminates the influences of conduction that dominate the performance of traditional MLI. As illustrated in FIG. 7A, also from Donabedian et al, a "bare" MLI blanket shows some degradation over ideal, while an "installed" blanket sewn together with seams, vents, and cut-outs, suffers significant performance degradation. FIG. 7A shows the tested results of the traditional MLI as well as a theoretical "perfect performance" curve. Thermal models of the innovative designs of the systems fabricated and disclosed herein show close conformance to this theoretical "perfect performance" curve.

An example shell system 200 design with five MLI/MMOD shell layers 213, each metallized on both sides, can be expected to exhibit a heat flux of 0.41 W/m$^2$ and an equivalent emissivity performance of $\varepsilon^*=0.003$ when installed around a hydrogen tank parent structure 220 of temperature 20 K and a sink temperature of 220 K. The disclosed architecture facilitates addition of specifically thermal shell layers between the shell layers incorporating MMOD protective materials, thereby optimizing both thermal insulation and MMOD shielding performance. For example, one additional MLI layer positioned between the five aforementioned MLI/MMOD layers reduces heat flux to less than 0.25 W/m$^2$. This illustrates a significant advantage over traditional MLI. The determinate thermal performance of systems 200 disclosed herein can allow design modification without lengthy and costly design and test cycles to develop manufacturing techniques and verify performance.

FIG. 7B shows the thermal model of the penetrating heat flux as a function of the number of individual MLI/MMOD layers according to a design previously built by the named inventors of this patent application. A minimally tensioned tape 235 connected expanded system 200 eliminates the thermal shorts and mass impact seen in traditional MLI by eliminating layer-separating scrim and the required quilted fabrication structure of conventional MLI. These data suggest that five layers of conduction-minimized MLI shell layers 213 result in 0.5 W/m$^2$ flux compliance on a cryotank with a warm boundary of 220 K on orbit, assuming no edge or penetration losses.

Another valuable result captured in FIG. 7B shows the calculated ratio of radiative heat transfer between the shell layer stack 210 to the conductive heat transfer through the series of connecting tension connectors 235 as a function of the number of shell layers 213. These data indicate that, for any readily manufacturable number of layers 213, the impact of conduction is negligible. For example, conduction is less than 1/40th, or 2.5% of the total heat transfer through twelve layers. Furthermore, conduction remains less than about 10% of the total heat transfer for a tension connector grid spacing of 25 cm (10 in), which was four times an initially baselined areal density, or alternately described, using four times thicker, shorter, or more conductive tension connectors 235.

In short, the inventors have found that the system architectures disclosed herein can provide a radiation dominated expandable thermal insulation shell system with a large degree of design flexibility. The determinacy of this performance metric is an important attribute for the system, considering that heat flux in traditional MLI systems is generally dominated by conduction. This is clear in FIG. 7A where the effective conductance performance as historically compiled for MLI systems is seen to be two to five times greater than that predicted by a radiation dominated system in close accordance with the shown theoretical curve of optimum conductance. Compared to traditional designs, the separation 215 (see also 315) between the layers 213 (and 313) of the present invention presents a much greater path length for conduction as well as a minimal conductive cross-sectional area. Due to the latitude afforded by the strong dominance of radiation in the herein disclosed designs, the theoretical curve can be used to precisely determine the number of layers needed for a requisite level of effective emittance. This overall performance determinacy furthermore greatly simplifies the thermal design as compared to traditional MLI. The disclosed concepts also utilize continuous, uninterrupted, and substantially concentric shell layers 213 thereby presenting little impact of parasitic thermal edge effect losses, offering distinct advantage when compared to traditional MLI blankets manufactured in comparatively small sections that need to be recombined to be able to provide larger area coverage.

The expandable shell systems disclosed herein can define an architecture of two or more, and optimally five or more, minimally supported shell layers 213. Each shell layer 213 can be separated by a gap of 25 to 50 mm (1 to 2 inches) upon expansion according to certain designs. Besides the significant advantages in thermal insulation performance described earlier herein, the shell system 200 and 300 configurations, for example, are also ideally suited to multi-layer MMOD shield functionality. A single thick, dense MMOD shield layer must decelerate and absorb the energy of an incoming particle over a very small area thereby requiring a large amount of shield mass. With a multiple layer MMOD shield, the incoming debris particle is shocked by the exterior shield layer causing it to fracture into smaller particles, which spread out between layers. Successive layers further shock, distribute, and capture these successively lower energy particles. Thus, a multi-layer MMOD shield effectively distributes the particle impact energy over a much larger ultimate surface area, paving the way to a significantly reduced MMOD shield mass. Herein disclosed designs can minimize the mass required for MMOD protection by utilizing the geometry provided by the MLI design, providing a system co-optimized for each function.

For example, a multilayer MMOD shield for a two-year mission at ISS altitude and a 95% probability of no penetration also suggests a six-layer design as built, tested, and calculated by the inventors of this patent. Six example embodiment layers of ceramic Nextel™ fiber fabric, each with an areal density of 270 g/m² (8.0 oz/yd²) and distributed over a total cumulative separation of 25 cm (10 inches), provide adequate debris shielding protection. Woven glass fiber fabric presents a lower cost option while offering relatively similar MMOD protection performance. The MMOD layers use all of the same structural features required of the MLI design for little parasitic mass, allowing for independent co-optimization of the MLI and MMOD functions.

MMOD shield design analysis begins with the "Probability of No Penetration" (PNP) requirement. The PNP requirement, coupled with the surface area of the vehicle, determines the allowable flux of penetrating particles. This allowable flux is compared to the flux distribution in the MMOD environment to determine the critical particle size that the shielding must protect against. The MMOD shield of currently disclosed embodiments can prevent penetrations of particles smaller than the critical particle size, while the flux of particles larger than the critical size is small enough that the PNP requirement is met.

An example of a baseline MLI/MMOD subsystem illustrated herein can include six identical shell layers 213, each of which comprises an MMOD shielding fabric 376 sandwiched between two MLI film layers 375. This design results in the three-element protective shell 213 layup, such as shown in FIG. 3C. The illustrated MLI material can include aluminum coated films such as polyimides KAPTON or UPILEX, or biaxially-oriented polyethylene terephthalate (BoPET) such as MYLAR. Example SHELDAHL™ material of this type has a total thickness of 51 μm (2.0 mil). The three layers may be mutually connected employing connective mechanisms such as adhesive bonding; ultrasonic, radio frequency, or heat bonding; sewn stitching; and/or the like. The elements of the layup can be continuously connected or connected at interval to keep the layup conformal during assembly and application Similar connective mechanisms such as adhesive bonding 338 may be used to structurally fasten tension connectors 335 to shell layers 313, as shown in FIG. 3C. Such adhesive bonding 338 provides effective load transference between batten sleeves 372 (see also 272) and the system's 300 base shell layer 313A (see also 213A) without alloying loads directly to the MLI or MMOD materials.

Figure 8B:
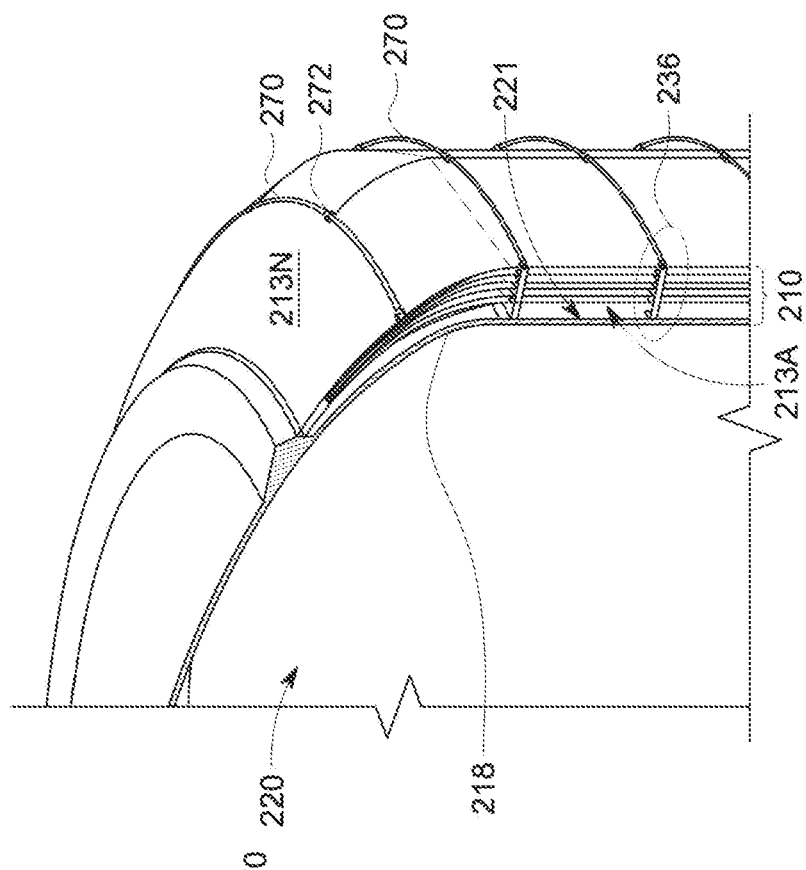
FIG. 8B is a close-up cross-sectional diagram of the end cap area of the assembly of FIG. 8A.
Figure 8A:
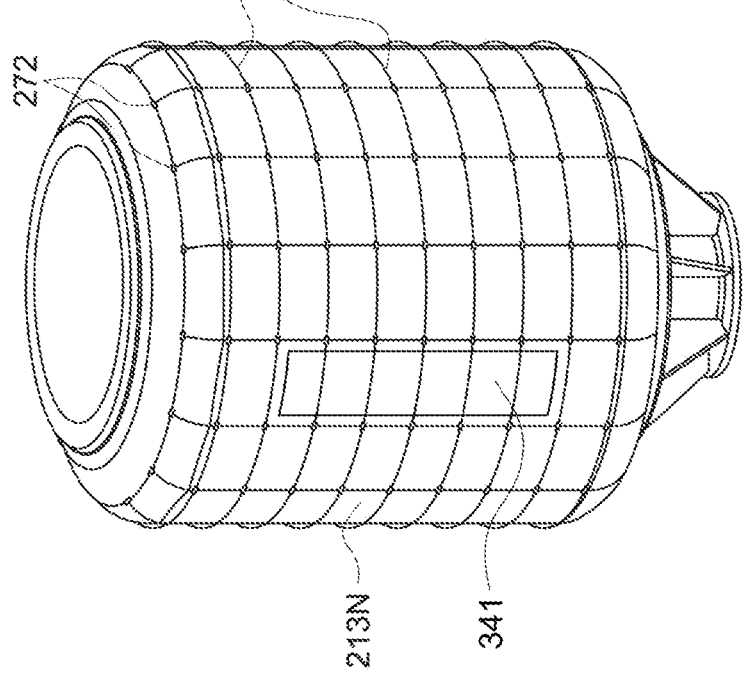
FIG. 8A is a diagram showing a parent structure with an expandable protective system including circumferentially oriented batten extendable support members.
Figure 9B:
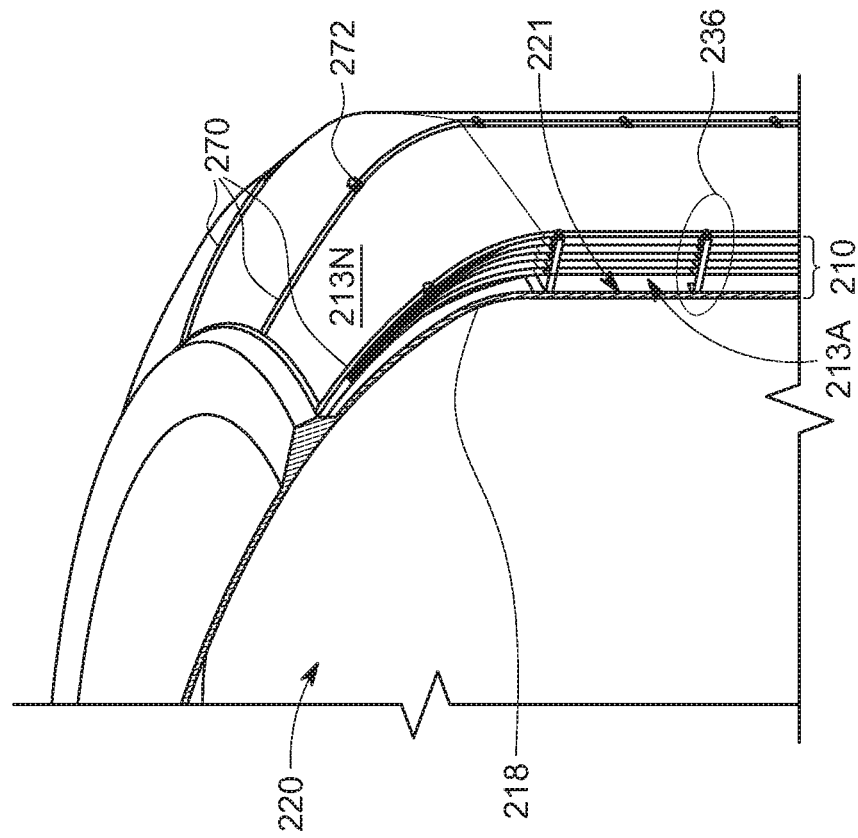
FIG. 9B is a close-up cross-sectional diagram of the end cap area of the assembly of FIG. 9A.
Figure 9A:
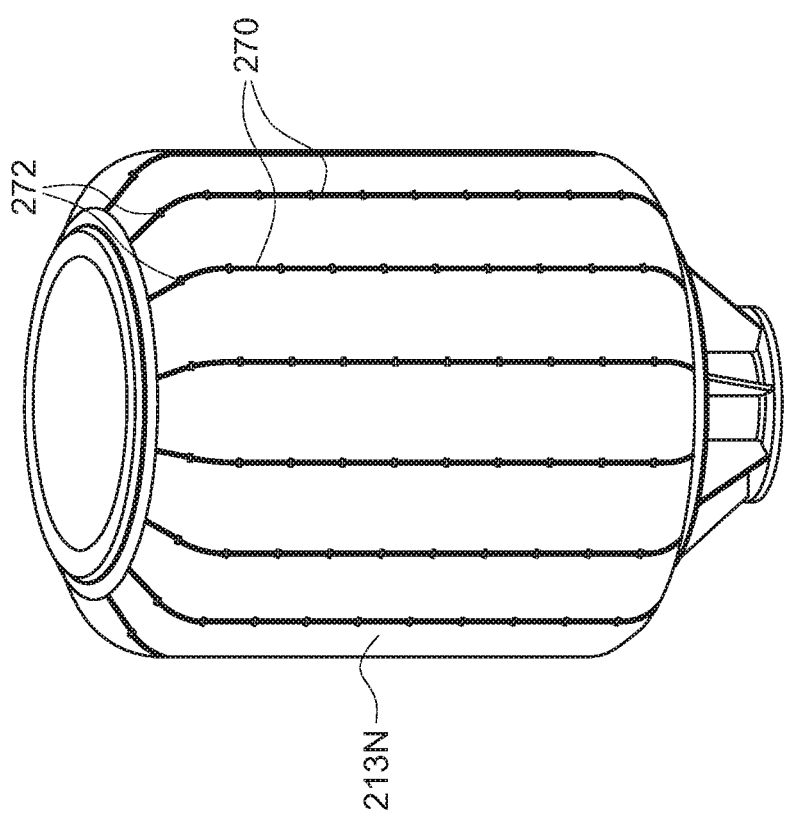
FIG. 9A is a diagram showing a parent structure with an expandable protective system including meridionally oriented batten extendable support members.
Figure 10B:
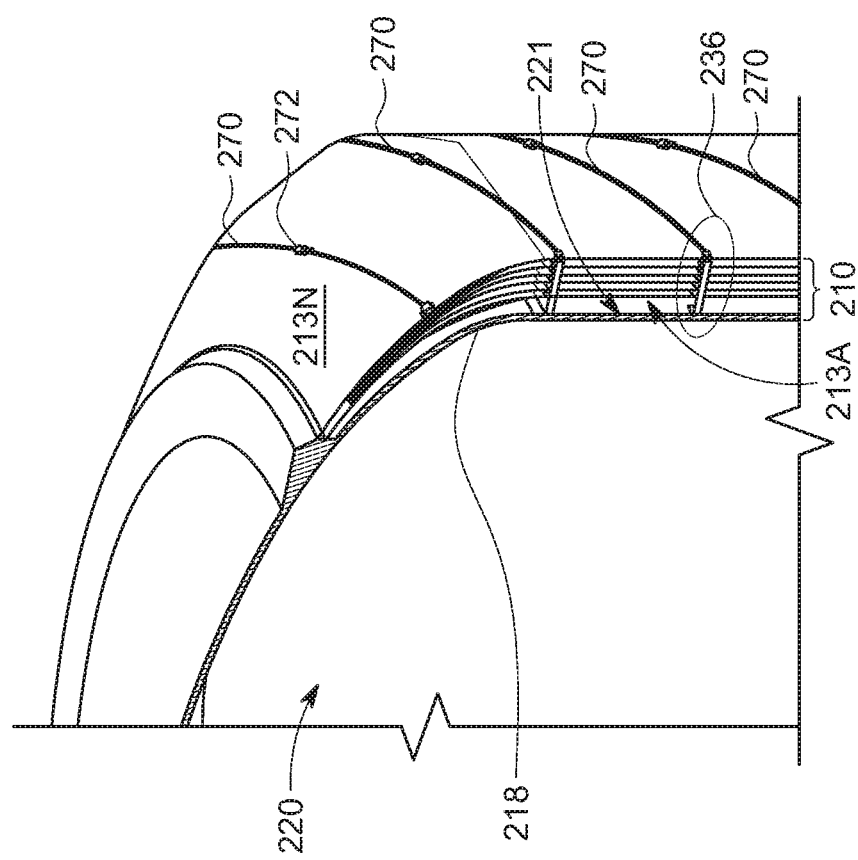
FIG. 10B is a close-up cross-sectional diagram of the end cap area of the assembly of FIG. 10A.
Figure 10A:
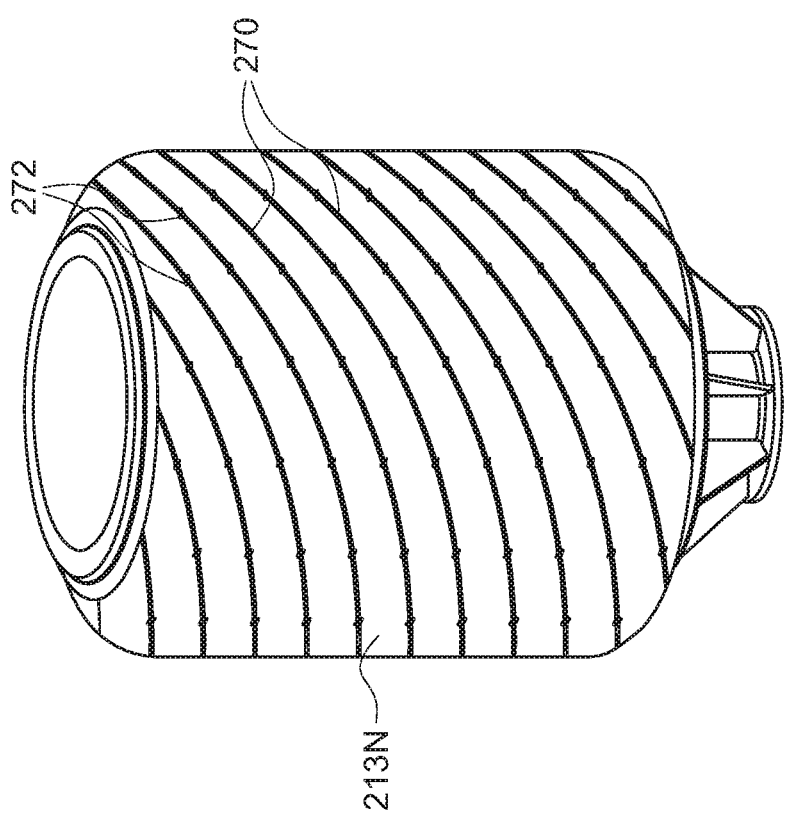
FIG. 10A is a diagram showing a parent structure with an expandable protective system including spiral oriented batten extendable support members.

The functionality of the expandable shell system 200 can also be applied to one or both cryotank parent structure 220 end caps 218. A view of a configuration which insulates a portion of the tank end is shown in FIGS. 8A and 8B. FIG. 8A shows that the concept of a circumferential batten 270 (see also 370) to provide tension to the external shell 213N (see also 313N) of the expandable shell system 200 (and 300) can also be used on an end cap 218 to provide layer separation. In such a configuration a secondary insulation system, traditional MLI or other high performance MLI can be used to provide insulation to the upper portion of the tank.

To summarize some of the important advantages of the disclosed systems and methods for implementation, manufacture, and upon deployment can include one or more of the following: a reduced mass pressure stabilized fairing system as a stand-alone benefit; reduced parasitic mass of fairing as it is retained for MMOD and thermal protection; reduction of pyrotechnic payload fairing jettison complexity compared to traditional fairing; launch/ascent/transit/and atmospheric entry protection in a single system; reduced launch volume to attain the required MMOD and thermal protection; enhanced thermal protection with fewer layers than possible with currently existing traditional MLI systems; reduced mass when compared to separate MLI and MMOD systems; reduced cost schedule and risk associated with design, build, integration and testing; elimination of uncertainties in thermal insulation performance inherent in the traditional MLI systems; significantly reduced thermal shorts compared to currently existing traditional MLI systems; cost savings over previously existing or known state-of-the-art payload fairings, MMOD, and insulation systems; the opportunity for zero-boil-off (ZBO) cryogenic storage with minimal requirement for any additional active cooling systems; and/or greater potential system level optimization for future inflatable habitat systems and other space structures.

As disclosed in various levels of detail herein, a near term application for the technologies disclosed herein is the Exploration Upper Stage (EUS) of SLS, although other applications are anticipated. The barrel section and thermally connected skirts of the SLS-EUS Hydrogen tank are windswept after launch. Traditional MLI cannot withstand an aerodynamic wind loading environment, requiring a more robust solution. The systems disclosed herein have strong improvements for this application, either in a configuration which uses the exterior cover of the compressed and packaged MLI and MMOD subassembly as a windswept surface; as a pressure stabilized fabric nose cone for launch vehicles, SLS solid rocket boosters, and the like; and/or with a minimally pressurized inflatable payload fairing which would protect all of the underlying layers and tankage systems as proposed for orbital cryogenic depot application. Together each of these valuable system attributes offer mission critical aspects for long mission durations required for lunar, Mars, or deep space exploration. Additional examples include zero boil-off orbital propellant depots, cryogenic coolant storage for advanced telescopes, habitat protection for manned space stations, transfer vessels, and rovers and base modules on the Moon, Mars, or asteroids, for example.

Although various embodiments have been described with reference to specific examples and embodiments it will be evident that various modifications and changes may be made to these embodiments without departing from the broader spirit and scope of the disclosed subject matter. Accordingly, the specification and drawings are to be regarded in an illustrative rather than a restrictive sense.

The foregoing description of the specific embodiments reveals the general nature of the technology sufficiently that others can, by applying current knowledge, readily modify and/or adapt the innovative designs disclosed herein for various applications without departing from the generic teachings, more specific teachings, and examples of applications. Therefore, such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

We claim:

1. An expandable system for surrounding at least in part a structure, comprising:
    a first shell layer conforming to an outer surface of the structure;
    a second shell layer disposed contiguously adjacent in sequence to the first layer;
    a tension connector disposed between the first shell and second shell layer, the tension connector:
        connected to adjacent surfaces of the first shell layer and the second shell layer; and
        retaining in tension the first shell layer relative to the second shell layer after expansion of the expandable system, the tension connectors maintaining a prescribed spacing between the first shell layer and second shell layer in an expanded state.

2. A method of expansion of the expandable system according to claim 1, wherein the second shell layer is passively distended relative to the first shell layer by internal gas expansion.

3. The method of expansion of the expandable system according to claim 2, wherein the internal gas expansion is due to a pressure differential due to a reduced environmental pressure.

4. The expandable system according to claim 1, wherein the second shell layer is an outermost shell layer of the expandable system.

5. The expandable system according to claim 4, the second shell layer further comprising one or more vent apertures.

6. The expandable system according to claim 5, the one or more vent apertures allowing for gas to be released from inside the second shell layer of the expandable system to the environment outside of the expandable system.

7. The expandable system according to claim 1, wherein the tension connector is foldable prior to expansion of the expandable system.

8. The expandable system according to claim 7, wherein the length of the tension connector is at least 100 times larger than the thickness of the tension connector.

9. The expandable system according to claim 1, the tension connector being in the form of a strip of material adhered at opposing ends to the adjacent surfaces of the first shell layer and the second shell layer.

10. The expandable system according to claim 1, further comprising an extendable support member, wherein the tension connector is statically supported by the extendable support member when the expandable system is fully expanded.

11. The expandable system according to claim 1, wherein the second shell layer is an outermost shell layer, the expandable system further comprising a support batten supporting the second shell layer.

12. The expandable system according to claim 11, the second shell layer including a batten sleeve, the support batten extending within the batten sleeve.

13. The expandable system according to claim 11, wherein the support batten is extendable.

14. The expandable system according to claim 13, wherein the support batten is configured to lock in an extended state.

15. The expandable system according to claim 11, the support batten extending in a circumferential, spiral, or meridional direction relative to a central axis of the expandable system.

16. The expandable system according to claim 1, further comprising a rigidizing media disposed on the second shell layer or an exterior cover, the rigidizing media providing means for maintaining the tension of the tension connector.

17. The expandable system according to claim 16, wherein the rigidizing media includes a resin and/or adhesive that hardens upon exposure to an environmental condition.

18. The expandable system according to claim 17, the environmental condition including ultraviolet light.

19. The expandable system according to claim 1, wherein the first shell layer is an innermost shell layer and the first shell layer conforms to an outer surface of the structure before expansion or both before and after expansion.

20. The expandable system according to claim 1, wherein the first shell layer and second shell layer are actively distended.

21. The expandable system according to claim 20, wherein the first shell layer and second shell layer are actively distended by a pump, or by gas from a reservoir, or by a gas generator.

22. The system according to claim 1, wherein the structure includes a cryogenic tank surrounded at least in part by the expandable system.

23. The expandable system according to claim 1, further comprising a compression system.

24. The expandable system according to claim 23, the compression system compressing the second shell layer against the first shell layer.

25. The expandable system according to claim 24, further comprising a release system, the release system releasing the compression system thereby allowing at least the second shell layer to distend under internal pressure.

26. The expandable system according to claim 1, further comprising an exterior cover surrounding the expandable system.

27. The expandable system according to claim 26, the exterior cover including a fabric woven from fibers.

28. The expandable system according to claim 27, the fibers including glass, carbon, ceramic, liquid-crystalline polyoxazole, and/or aramid.

29. The expandable system according to claim 27, further comprising a heat resistant coating and/or film and/or foil maintaining fabric integrity and providing surface finish resistant to aerodynamic force.

30. The expandable system according to claim 29, the coating or film including silicone, a fluoropolymer, and/or fluorinated ethylene propylene.

31. The expandable system according to claim 26, wherein the exterior cover includes a flexible radiator panel and/or a flexible solar panel.

32. The expandable system according to claim 1, further comprising a plurality of additional shell layers and additional tension connectors, each tension connector connecting adjacent surfaces of adjacent shell layers.

33. The expandable system according to claim 32, the expandable system including at least five shell layers.

34. The expandable system according to claim 1, wherein at least the second shell layer comprises polyester or polyamide film.

35. The expandable system according to claim 1, wherein at least the second shell layer incorporates a metallic film or vapor deposited metal coating.

36. The expandable system according to claim 1, at least the second shell layer being a protective layer.

37. The expandable system according to claim 36, wherein at least the second shell layer incorporates a debris shielding material, fiber, and/or coating.

38. The expandable system according to claim 36, wherein at least the second shell layer includes a shear-thickening resin, ceramic, or glass fiber-based fabric.

39. The expandable system according to claim 36, wherein at least the second shell layer is laminated on one or both sides with KAPTON.

40. A method of expanding the expandable system according to claim 1, comprising:
providing the expandable system in collapsed state;
transporting the expandable system to a destination; and
once at the destination, the expandable system expanding into an expanded state.

41. The method according to claim 40, further comprising releasing an exterior cover surrounding the expandable system.

42. The method according to claim 40, the expandable system passively expanding due to reduced environmental pressure.

43. A combined expandable system and the structure of claim 1, comprising:
the structure of claim 1;
the expandable system of claim 1 in a collapsed state prior to expansion, including:
the first shell layer having a cross-sectional area; and
the second shell layer disposed upon the first shell layer, the second shell being larger in cross-sectional area than the first shell layer, the second layer being folded so as to have a folded cross-sectional area substantially similar to the cross-sectional area of the first shell layer.

44. The combined expandable system according to claim 43, the first shell layer conforming to an outer surface of the structure.

45. The combined expandable system according to claim 43, further comprising a collapsed extendable support member coupled to the second shell layer.

46. A combined expandable system and structure according to claim 43, wherein the first shell layer and the second shell layer are exterior to, and conform to, an outer surface of the structure.

* * * * *